United States Patent [19]

Jackson

[11] Patent Number: 4,596,900
[45] Date of Patent: Jun. 24, 1986

[54] PHONE-LINE-LINKED, TONE-OPERATED CONTROL DEVICE

[76] Inventor: Philip S. Jackson, 5305 N. Neenah, Chicago, Ill. 60656

[21] Appl. No.: 507,702

[22] Filed: Jun. 23, 1983

[51] Int. Cl.⁴ ............................................. H04M 11/00
[52] U.S. Cl. ................................ 179/2 A; 179/84 VF; 179/6.11; 179/5 R
[58] Field of Search ................... 179/2 A, 2 AM, 5 R, 179/5 P, 6.16, 6.11, 6.13, 6.07, 6.03, 84 VF

[56] References Cited

U.S. PATENT DOCUMENTS

| | | | |
|---|---|---|---|
| 3,829,616 | 8/1974 | Blouch | 179/2 A |
| 3,902,016 | 8/1975 | Blouch | 179/2 A |
| 3,992,587 | 11/1976 | Puckett et al. | 179/2 A X |
| 4,006,316 | 2/1977 | Bolgiano | 179/2 A |
| 4,121,053 | 10/1978 | Dick | 179/2 A |
| 4,491,690 | 1/1985 | Daley | 179/2 A |

Primary Examiner—James L. Dwyer
Attorney, Agent, or Firm—Trexler, Bushnell & Wolters, Ltd.

[57] ABSTRACT

A phone-line-linked, tone-operated control apparatus in accordance with the invention comprises a detecting circuit coupled to a telephone line for detecting at least one predetermined sequence of predetermined tone signals received on the telephone line and for producing a corresponding sequence detection signal. An additional control circuit is responsive to the sequence detection signal for producing a corresponding control signal. Preferably, a break-in prevention circuit prevents access to the control apparatus unless a predetermined access code is first given.

17 Claims, 6 Drawing Figures

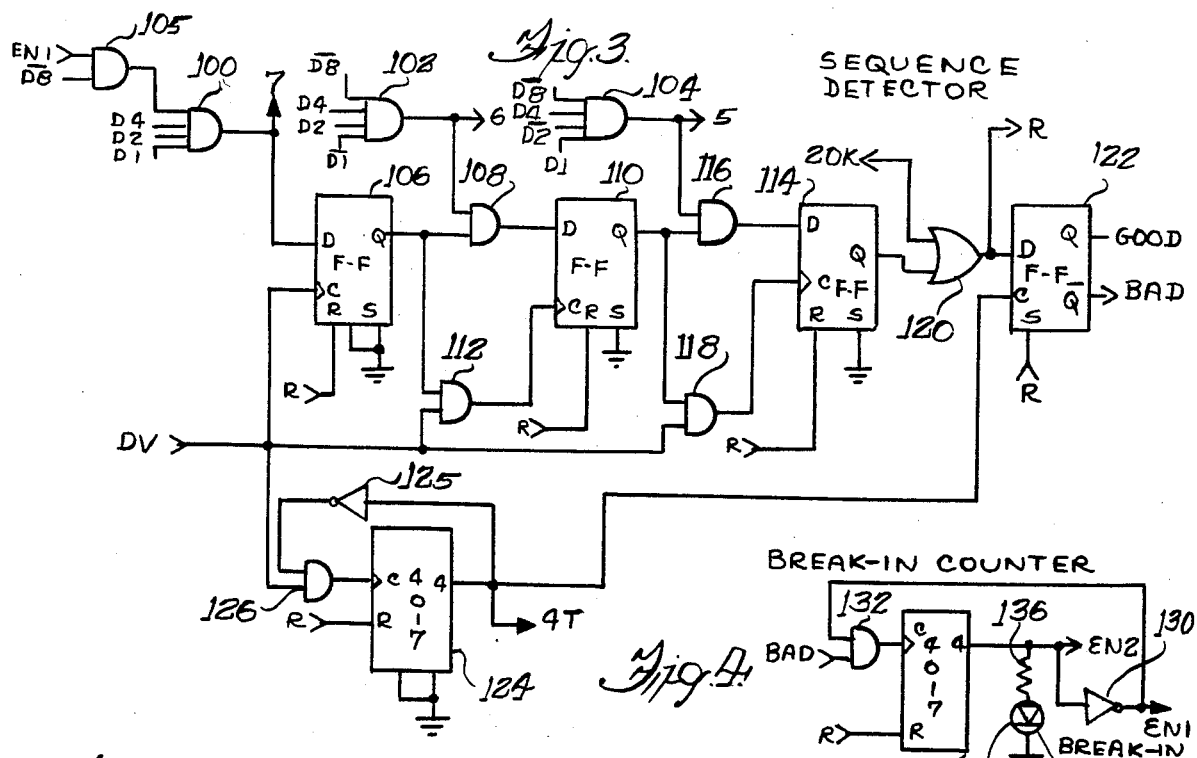
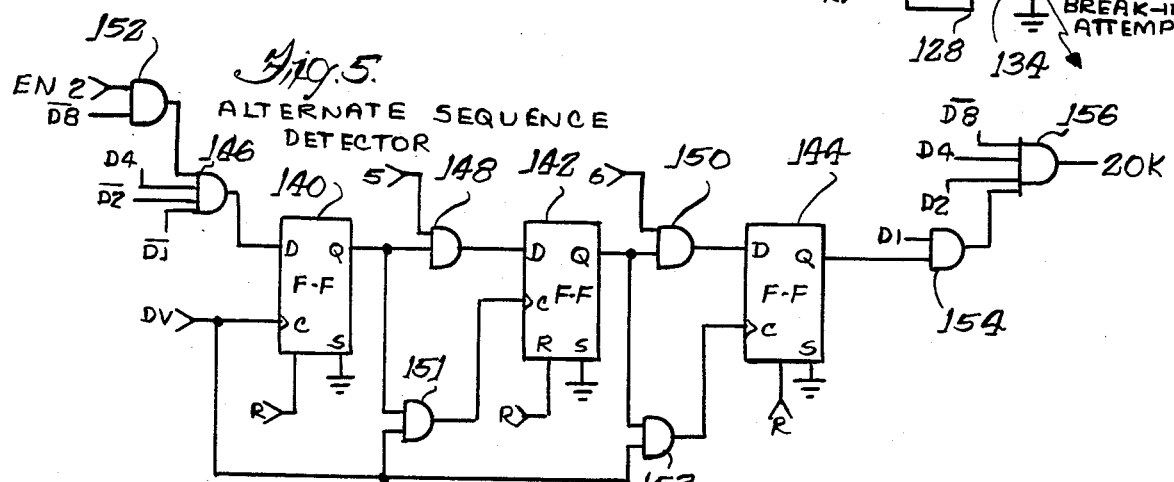
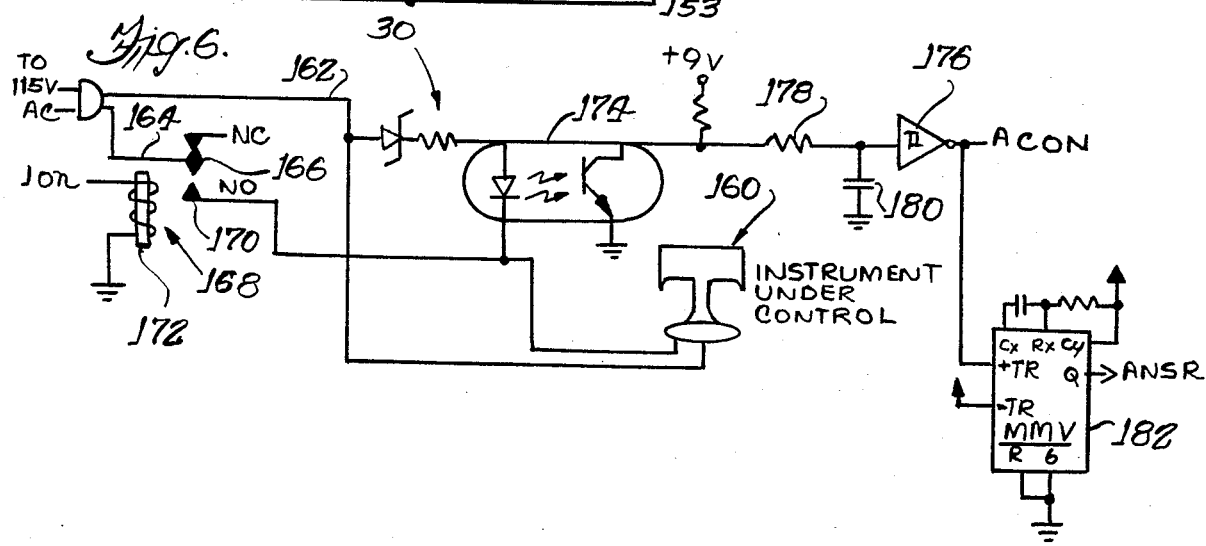

PHONE-LINE-LINKED, TONE-OPERATED CONTROL DEVICE

BACKGROUND OF THE INVENTION

The invention is directed generally to the control arts, and more particularly to a novel apparatus for producing control signals in response to the reception of predetermined tone signals over a telephone line.

In recent years, increasing attention has been given to the field of home electronics and the like. With the advent of modern telephonic communication, as well as the availability of home computers and the like, a number of applications of such systems to home or personal use have been developed. For example, it has been suggested that home computers be utilized to control, through suitable interface devices, various devices in the home such as heating and air conditioning systems, lighting, appliances, and the like.

However, home computers and the necessary interface devices for performing such automatic control functions are still relatively expensive. Moreover, most such computers and other devices require some degree of skill or expertise in their installation and operation. Accordingly, the average consumer may not readily be able to utilize such computer control applications because of either financial considerations or lack of requisite knowledge and skills.

Advantageously, the present invention proposes a phone-line-linked, tone-operated control device for producing suitable control signals for use in home automatic or remote control applications. Moreover, the apparatus of the invention operates automatically in response to tone signals of the type produced by ordinary Touch-Tone telephones over conventional telephone lines. More specifically, any device producing tones commonly known as DTMF tones, such as Touch-Tone telephones, can be utilized to operate the apparatus of the invention. Accordingly, the consumer need only understand the operation of a conventional Touch-Tone telephone to utilize the present invention. That is, no special transmitting unit or device is required, whether permanently installed or a portable unit to be carried by the user. Rather, the invention may be operated from any available telephone transmitter.

Additionally, a preferred form of the invention contemplates prevention of unauthorized access or usage of the foregoing control system. To this end, a preferred form of the invention also provides a novel break-in prevention feature, which requires the entry of a selectible code over a Touch-Tone telephone line, to permit access to the remote control features of the invention. Again, however, no special transmitting unit or other device is required, the necessary code being in the form from the tones provided by any conventional, available Touch-Tone type telephone receiver.

OBJECTS AND SUMMARY OF THE INVENTION

Accordingly, it is a general object of the invention to provide a novel and improved remote control device which requires no special training or expertise to utilize.

A more specific object is to provide a phone-line-linked control device for performing a control function in response to conventional tone signals transmitted over a conventional telephone line.

A related object is to provide apparatus in accordance with the foregoing objects which is relatively simple and inexpensive and yet highly reliable in operation.

Briefly, and in accordance with the foregoing objects, a phone-line-linked, tone-operated control apparatus in accordance with the invention comprises detecting means coupled to a telephone line for detecting at least one predetermined sequence of predetermined tone signals received on said telephone line and for producing a corresponding sequence detection signal; and control means responsive to said sequence detection signal for producing a corresponding control signal.

In accordance with a preferred form of the invention an access limiting apparatus is also coupled with the control apparatus and prevents operation thereof until an access code comprising a predetermined sequence of predetermined tone signals is first received.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 3 is a schematic circuit diagram illustrating one portion of a novel break-in prevention circuit in accordance with a preferred form of the invention;

FIG. 4 is a schematic circuit diagram of a further portion of the break-in prevention circuit of FIG. 3;

FIG. 5 is a schematic circuit diagram of a still further portion of the break-in prevention circuit of FIGS. 3 and 4; and FIG. 6 is a schematic circuit diagram of one form of feedback circuitry in accordance with a preferred form of the invention.

DETAILED DESCRIPTION OF THE ILLUSTRATED EMBODIMENT

Figure 1:
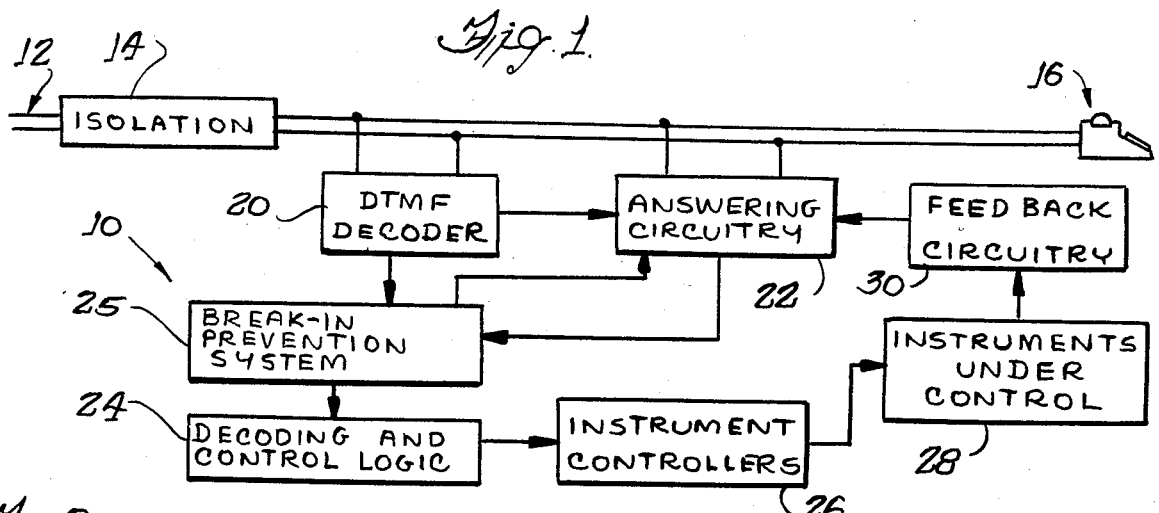
FIG. 1 is a block diagram of a control system utilizing apparatus in accordance with the invention.

Referring now to the drawings and initially to FIG. 1, apparatus in accordance with the invention is illustrated in the form of a control system, designated generally by the reference numeral 10. The control system 10 is linked to conventional telephone lines 12 by means of a suitable, conventional isolation apparatus 14, generally in parallel circuit with a conventional telephone receiver 16.

A dual-tone, multiple-frequency (DTMF) decoder 20 and a suitable automatic answering circuit 22 are generally coupled in parallel circuit with the telephone receiver 16. Briefly, the DTMF decoder 20 produces standard logic-level signals in response to the dual-tone frequencies generated by conventional push-button or "Touch-Tone" telephone apparatus. Additionally, the DTMF decoder 20 produces analog signals in response to the conventional tip/ring voltages, scaled down for use in the other circuitry, as will be described presently.

An additional decoding and control logic circuit 24 receives the signals from the DTMF decoder 20. In accordance with a feature of the invention, this decoding and control logic circuit 24 is responsive to predetermined sequences of signals from the DTMF decoder 20 for producing corresponding control output signals. Generally speaking, the DTMF decoder 20 and a decoding portion of the circuit 24 together comprise a sequence detection circuit responsive to a preselected sequence of tone signals received on the phone lines 12 for producing a corresponding sequence detection signal. A control logic portion of the circuit 24 is further responsive to this sequence detection signal for producing a corresponding control output signal for an instrument controller 26. This instrument controller 26 in turn controls the operation of one or more instruments 28.

Briefly, such control may comprise turning on and off various devices, making adjustments in their operation, checking their status, and the like. Suitable feedback from the controlled instrument or instruments may be provided by way of a suitable feedback interface circuitry 30 to the answering circuitry 22, which responsively outputs a suitable signal to the telephone lines 12 to indicate the status of the controlled instrument or instruments 28.

Advantageously, then, the control system 10 of the invention is useful in parallel with the conventional telephone receiver 16. That is, the system 10 does not interfere with normal use of the receiver 16. Moreover, the system 10 may be utilized to control one or more devices 28 in the manner just described while a normal conversation is in progress over the receiver 16.

In this regard, the decoding and control logic 24 may also be coupled with the answering circuitry 22 to synchronize its operation therewith. Furthermore, circuit 24 may be arranged to cause the answering circuitry 22 to disconnect the system of FIG. 1 from the phone line 12, if an improper sequence of tones is received, as may occur for example in an attempt to gain unauthorized access or "break-in" to the system of FIG. 1.

The answering circuitry 22 may be adjusted to couple the system with the phone lines 12 at the first detection of a ring or after a desired number of ring tones received on the line 12.

Figure 2:
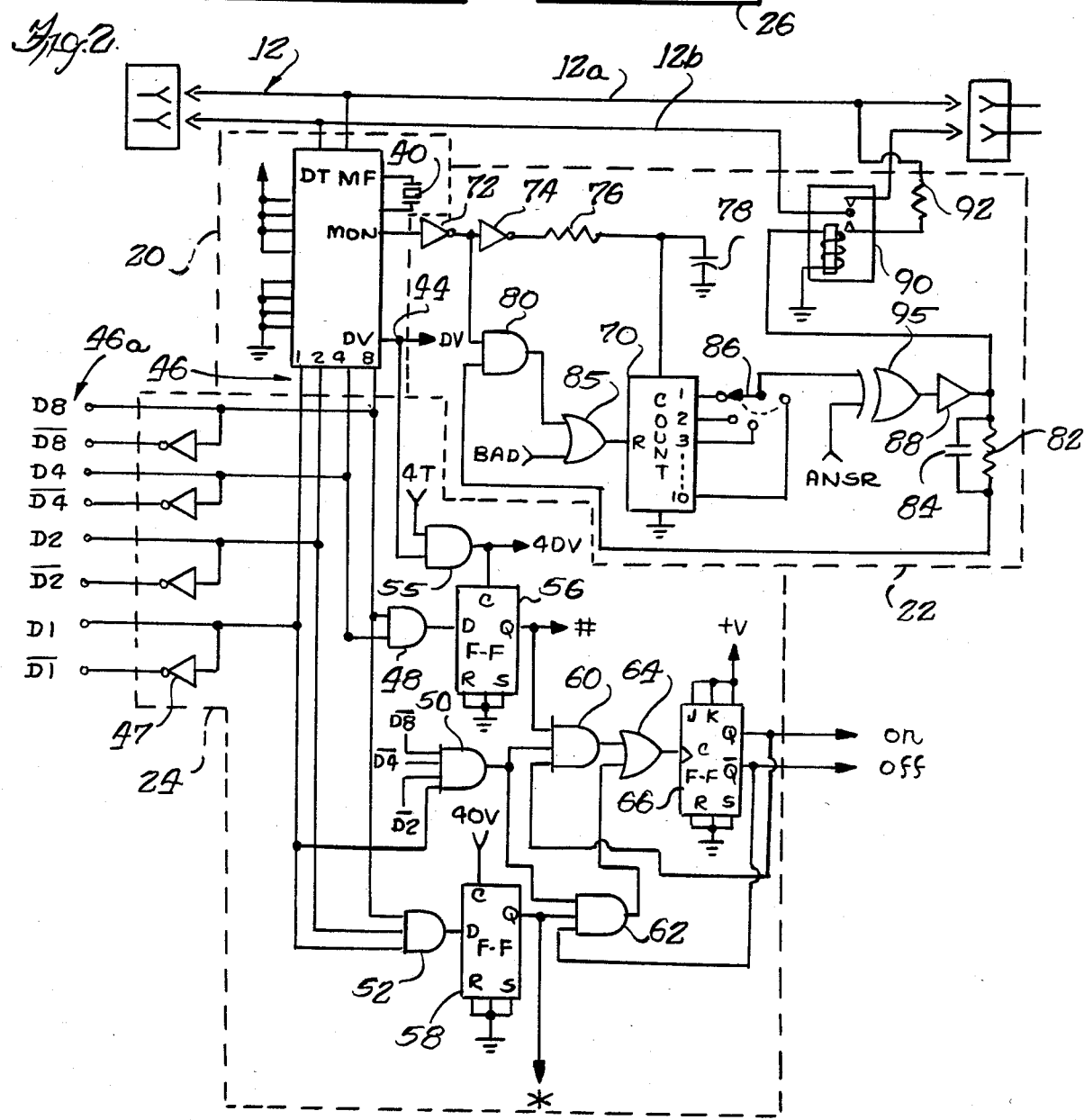
FIG. 2 is a schematic circuit diagram illustrating further details of the apparatus of the invention.

Referring now to FIG. 2, a schematic circuit diagram illustrates various features of the system of FIG. 1 in greater detail. The DTMF decoder 20 comprises an integrated circuit component of the type generally designated ITT3210 DTMF receiver, and is provided with a 3.58 MHz crystal 40. Suitable DC power for the DTMF decoder 20, as well as for the other circuits of FIG. 2 may be provided by suitable DC batteries (not shown) or by any other suitable DC voltage supply.

In operation, the DTMF decoder 20 receives conventional telephonic signals over phone lines 12, which comprise conventional tip and ring lines 12a and 12b respectively. A line monitoring output (MON) 42 provides a signal which is usable as a CMOS logic 1 or high level when a ring is deteted on the phone lines 12 and a logic 0 or low level when no ring is in progress. An additional DV output 44 signals detection of a valid DTMF tone of the type produced by a conventional push-button or "Touch Tone" telephone.

Accordingly, access to the system from a remote location may be achieved by use of a conventional DTMF telephone transmitter over conventional telephone lines. The system of the invention therefore operates essentially as an independent telephone receiver, whereby it may be wired independently to phone lines 12 or in parallel with a standard receiver 16 as shown in FIG. 1, as desired. As previously mentioned, when connected in parallel with the standard receiver 16, the system of the invention does not interfere with normal operation thereof. That is, the tone signals to which the circuitry of the invention responds may be received independently of operation of the receiver 16, or even at the same time as a normal conversation is in progress, allowing "break-in prevention" and operation of instruments under control by use of the tone signals, but otherwise permitting use as a conventional telephone without any interference therebetween.

The DV signal comprises standard CMOS logic levels, and transmits a logic 1 or high level each time a valid push-button tone is decoded by decoder 20 and a logic 0 or low level at other times. The remaining outputs of the DTMF decoder 20 encode possible push-button tone signals representing digits 0 through 9, as well as * and # into a 4-bit binary encoded form on a 4-bit output 46. Although not presently in common use, push-button or Touch Tone telephones are capable of producing four additional dual-tone signals, which the DTMF decoder 20 is also capable of encoding into 4-bit digital form.

In the illustrated embodiment, two sequences of these encoded signals have been selected for producing respective "on" and "off" control signals. The decoding and control logic 24 includes circuitry responsive to the sequence of the tone signals encoded into binary form on the outputs 46 of the decoder 20 for producing these "on" and "off" control output signals. These control signals are then fed to the instrument control circuitry 26 of FIG. 1. In the illustrated embodiment, the sequence #, 1 is detected to turn the instrument off, and the sequence *, 1 is detected to turn the instrument on. In this regard, the decoder 20 encodes "#" as 1, 1, 0, 0 (in descending order, from the most significant or 8's place to the least significant or 1's place). Similarly, "*" is encoded as 1, 0, 1, 1; while "1" is encoded as 0, 0, 0, 1.

In order to provide both the logic signals from the lines 46 as well as the inverted logic content thereof, each of the lines 46 is further provided with an inverter buffer 47. In this regard, the respective binary logic contents of the outputs 46 and their inverted forms are indicated respectively D1 and D1, D2 and D2, etc. These resulting logic outputs are indicated generally by the reference numeral 46a. It will be recognized that the non-inverted outputs 46a carry a logic "1" when the corresponding output of the DTMF 20 is activated, whereas the inverted outputs 46a will carry a logic content of "0" when the corresponding output 46 of the DTMF 20 is in an active condition.

Accordingly, the decoding and control logic 24 includes three detectors in the form of logic gates 48, 50 and 52 which are coupled to suitable ones of the output lines 46a for responding to the respective binary signals corresponding to tones representing #, * and 1, respectively. In this regard, the gate 48 comprises a two-input AND gate and has its inputs coupled respectively to respond to the logic content 1, 1, 0, 0 at output 46 of decoder 20.

Similarly, the logic gate 52 comprises a three-input AND gate and is coupled to respond to the logic content 1, 0, 1, 1 at output 46 of decoder 20. Finally, the AND gate 50 comprises a four-input AND gate coupled to detect the encoded 1 signal, which corresponds to a logic content of 0, 0, 0, 1 at output 46 of decoder 20. Accordingly, the respective gates 48, 50 and 52 detect signals of predetermined logic content produced by the decoder 20 at its output 46. Different logic contents corresponding to different code sequences may be selected without departing from the invention, by the simple expedient of selecting different ones of the outputs 46a as inputs to gates 48, 50 and 52.

In the illustrated embodiment, in order to detect the desired sequence of these encoded logic signals (#, 1 to turn the instrument off and *, 1 to turn the instrument on) the outputs of AND gates 48 and 52 are coupled with respective flip-flops 56 and 58. The output of AND gate 50 is coupled with one input of each of a pair of three-input AND gates 60 and 62.

In the illustrated embodiment, the flip-flops 56 and 58 comprise D-type flip-flops of the type generally designated 4013, and the outputs of respective AND gates 48 and 52 feed the respective data or D inputs thereof. The clock (C) inputs of the flip-flops 56 and 58 are coupled to receive the above-mentioned DV signal from the output 44 of the decoder 20. Preferably, a two-input AND gate 55 is interposed between the DV output and these clock inputs. This gate responds to a further signal "4T" from the break-in prevention circuit, to be described later, for delivering only those DV signals occurring after the fourth incoming tone and corresponding DV signal. The output of the gate is hence designated "4DV".

It will be remembered that a high or logic one signal is produced at DV output 44 upon encoding of a valid tone at the outputs 46 of decoder 20. In operation, the DV output signal is delayed slightly from the production of the encoded signal at outputs 46.

The respective set (S) and reset (R) inputs of the flip-flops 56 and 58 are coupled with circuit ground. The Q outputs of respective flip-flops 56 and 58 are coupled with respective inputs of the AND gates 60 and 62. Accordingly, the flip-flops 56 and 58 will be clocked by the 4DV signal upon each encoding of an incoming tone signal (after the fourth), thereby in effect transferring the logic state of the D inputs thereof to the Q output thereof. When the AND gate 48 produces a logic one in response to detection of the encoded # signal on lines 46, a logic one will be clocked to the 0 output of flip-flop 56. In the same fashion, the AND gate 52 will produce a logic one output to the data input of the flip-flop 58 when it detects the encoded * signal on the lines 46. This logic one will be clocked through to the Q output of the flip-flop 58 in response to the corresponding 4DV output positive transition. The Q outputs of flip-flops 56 and 58 are therefore also designated by "#" and "*" and are respectively coupled to second inputs of respective AND gates 60 and 62.

The AND gates 60 and 62 feed respective inputs of a two-input OR gate 64 which feeds the clock input of a further flip-flop 66. In the illustrated embodiment, the flip-flop 66 comprises one-half of a dual JK-type flip-flop of the type generally designated 4027. The Q and Q outputs of the flip-flop 66 are selected as the instrument "on" and instrument "off" control signal outputs, respectively. Moreover, the Q or "on" output feeds the remaining input of AND gate 60 while the Q or "off" output feeds the remaining input of the AND gate 62. The J and K inputs of flip-flop 66 are tied to a suitable positive potential, while the set and reset inputs thereof are tied to circuit ground.

In operation, the respective flip-flops 56 and 58 and associated gates 60 and 62 act as sequence detectors such that the gate 60 will produce a logic one or high output signal only in response to logic one or high signals at all three of its inputs simultaneously. The OR gate 64 will toggle the flip-flop 66 in response to a logic one signal at either input thereof. It will be remembered that a logic one is produced by the AND gate 50 upon detection of the encoded 1 signal on the output 46. However, the encoded # signal must immediately precede the encoded 1 signal in order to hold the Q output of flip-flop 56 at logic one as previously described. Due to the slight delay in the action of the DV output 44 of decoder 20, this loqic one at the Q output of flip-flop 56 will momentarily co-exist with the logic one at the output of AND gate 50. In effect, then, gates 48 and 50, flip-flop 56 and gate 60 respond to or detect the encoded sequence #, 1 and produce a corresponding detection signal. Gate 64 and flip flop 66 respond by producing a corresponding "off" control signal.

In the illustrated embodiment an additional control from the Q output of flip-flop 66 assures that repetition of the #, 1 ("off") sequence will not result in turning the instrument on. This is done by requiring a logic one state from the instrument "on" or Q output flip-flop 66 as the third input to AND gate 60.

From the foregoing it will be recognized that operation with respect to the instrument "on" sequence (*, 1) at AND gates 50 and 52, flip-flop 58 and AND gate 62 is substantially identical. In this regard, gates 50 and 52, flip-flop 58 and gate 62 detect the sequence *, 1 and produce a responsive detection signal. Gate 64 and flip flop 66 respond to this detection signal by producing a corresponding "instrument on" control signal. Additionally, a feedback signal from the Q or instrument off output of flip-flop 66 to gate 62 prevents production of the "on" signals unless the instrument is in the "off" state. Hence, repetition of the sequence *, 1 will not turn the instrument "off", if it is already in the "on" state.

It will be recognized from the foregoing that additional instruments or apparatus may be similarly provided with "on" and "off" control signals in response to additional, different selected sequences from the DTMF 20. For example, since the # and * decoded outputs are already available as the first in a two-signal sequence at the Q outputs of flip-flops 56 and 58, these may be utilized with other decoded digit tone signals to control further instruments or devices. That is, further gates such as AND gate 50 may be used to detect or decode binary signals corresponding to other digits. Additionally, similar gates such as the gate 60 may then be connected to receive the # and * outputs as well as the further decoded digit outputs so as to drive further flip-flops such as the flip-flop 66 in exactly the same fashion as described above so as to provide on and off control signals for additional instruments. For example, *, 2 and #, 2 might be used to control a second instrument and so forth by the simple expedient of a repetition of only a small part of the circuitry of FIG. 2. Other codes may of course be utilized by duplicating more of the decoding and control logic circuit 24 of FIG. 2, if entirely different on and off codes are desired.

Referring now to the answering circuitry 22, an integrated circuit counter component 70 is utilized to count the rings received on the phone line 12. In the illustrated embodiment, this counter comprises an integrated circuit component of the type generally designated 4017. The rings are detected by the decoder 20 and the count input (C) of the counter 70 is fed from the MON output 42 by way of a pair of inverter buffers 72, 74 and an RC filter comprising resistor 76 and capacitor 78.

The first inverter buffer 72 also feeds one input of a two-input AND gate 80, the output of which is coupled to activate the reset (R) input of the counter 70. The remaining input of AND gate 80 is coupled to a selected output of the counter 70 by way of a suitable RC time delay circuit comprising resistor 82 and capacitor 84. In the illustrated embodiment, an additional two-input OR gate 85 is interposed between the AND gate 80 and the R input of counter 70. This OR gate 85 functions to reset the counter in response to either of the AND gate 80 or a "BAD" logic signal produced by the break-in prevention circuit to be described later. As will be seen presently, resetting the counter 70 causes the answering circuitry 22 to "hang up".

The RC filter circuit (76, 78) filters the ring impulses in a ring burst to clock the counter 70 one count for each ring burst. The output of the counter 70 is switch selectable by switch 86 to choose from one to ten rings before enabling a series-connected buffer 88. This buffer 88 in turn activates a relay 90 which in effect "answers" the telephone by coupling a conventional 580 ohm termination resistor across the line. Any additional feedback signals, for example, from the circuit 30 of FIG. 1 are also applied to this phone connection relay 90.

In accordance with a preferred form of the invention an additional exclusive OR gate 95 is interposed between the ring number selector switch 86 and the buffer 88. This exclusive OR gate 95 receives a second input, labeled ANSR, from the feedback circuitry 30, as will be described in detail later. Briefly, the ANSR signal produced by this feedback circuitry momentarily disables gate 95, causing momentary disconnection of the phone line by relay 90. This momentary disconnection results in an audible "click" being sent over phone line 12 to verify operation of an instrument under control as will be more fully described later.

In operation, the MON output 42 will be remembered to produce a logic one or high level during each ring. This high level by way of the two inverter buffers 72, 74 and filter clocks the counter 70. The corresponding logic 0 or low level intermediate rings is then available by way of inverter buffer 72 for resetting the counter 70. Reset only occurs, however, when the selected count has been reached, and after the time delay (RC 82, 84).

The MON output 42 remains in the logic 1 or high level as long as the transmitting or remotely located telephone is on the line. When this transmitter goes off the line or "hangs up", the MON output 42 goes to a logic 0 or low state, thereby also enabling the reset of the counter 70 by way of the AND gate 80. The relay 90 is then de-activated and "hangs up" on its end of the line. Accordingly, if the calling party "hangs up", the foregoing circuits also "hang up" at their end of the line. This then permits the system 10 as well as the receiver 16 to be again reached in conventional fashion over the telephone lines 12.

In accordance with a preferred form of the invention, as previously mentioned an unauthorized access or "break-in" prevention circuit or system is also provided to cooperate with the circuit of FIG. 2, as previously generally indicated. Reference is now invited to FIGS. 3, 4 and 5 wherein the circuit portions making up this break in prevention circuit or system are illustrated in schematic form.

Briefly, this break-in prevention system permits only someone entering the correct sequence of touch tone signals to use the control system of FIG. 2 for controlling one or more instruments or devices. Moreover, any attempt to gain entry to the system without first entering in the proper access code will cause the answering circuitry 22 of FIG. 2 to "hang up". This prevents repeated break-in attempts with one phone call.

Additionally, to prevent repeated attempts at access by the use of successive different codes, a second, different entry access code is placed into operation automatically by the circuits to be described presently, following a preselected number of break-in attempts. As will be seen, the circuits may be readily modified and/or expanded to include additional alternate access or entry codes and to automatically switch to or activate more than two possible entry codes if desired. Accordingly, the following description illustrates one specific embodiment of such a break-in prevention circuit or system, it being understood that changes and modifications may be made without departing from the invention.

Referring initially to FIG. 3, a first access sequence detector is here illustrated in connection with an access sequence comprising touch-tone signals corresponding to 7, 6, 5, x, where x can be any signal at all ("don't care" or dummy signal). These signals are received by respective four-input AND gates 100, 102 and 104 from the encoded outputs 46 of the DTMF 20, by selecting the indicated ones of output lines 46a. Additionally, the first AND gate 100 receives an enable signal (EN1) by way of a further two-input AND gate 105 which is further coupled to receive a selected one (D8) of the signals from lines 46a. This enable signal is normally a logic 1 when the access sequence detector circuit of FIG. 3 is in operation.

The access sequence or entry code is detected much in the same way as the sequence for the instrument control as described above with reference to FIG. 2. In this regard, the first AND gate 100 feeds the data (D) input of a first flip-flop (F-F) 106. At the same time, the DV line from the DTMF 20 is coupled to the clock (C) input of the flip-flop 106. Accordingly, if a "7" is decoded, a logic 1 is clocked from the D input to the Q output of flip-flop 106. This Q output feeds one input of a two-input AND gate 108 whose other input receives the output of the "6" detection AND gate 102 and whose output feeds the data (D) input of a second, similar flip-flop 110. The clock (C) input of flip-flop 110 is coupled to the output of a further two-input AND gate 112 for response to the DV signal only when a "7" is decoded at the first flip-flop 106, resulting in a logic 1 at the Q output thereof. Accordingly, when a 6 is detected or decoded consecutively following a 7, the second flip-flop will clock a logic 1 from its D input to its Q output.

A third similar flip-flop 114 is then coupled by way of similar AND gates 116 and 118 to respond to an encoded "5" consecutively following an encoded "6" in the same fashion. The Q output of this further flip-flop 114 feeds one input of a two-input OR gate 120, the second input of which receives a similar output signal (2 OK) from the alternate access sequence detector of FIG. 5, to be described presently. A further similar flip-flop 122 has its data (D) input coupled for response to the OR gate 120. The output of OR gate 120 also provides a reset (R) signal.

The Q output of flip flop 122 is here designated as the "GOOD" signal, while the $\overline{Q}$ is designated as the "BAD" signal, these two signals indicating whether or not the correct access code sequence has been received. In this regard, the clock (C) input of flip-flop 122 is coupled for response to a tone counter 124. In the illustrated embodiment, the flip-flops 106, 110, 114 and 122 preferably comprise integrated circuit components of the type generally designated 4013 dual-D flip-flop, while the counter 124 comprises a decode counter of the type generally designated 4017.

The tone counter 124 is coupled to count the DV signals, and has its "number 4" output coupled to clock the flip-flop 122. Hence, the flip-flop 122 clocks through the data at its D input on the fourth-received DV signal, corresponding to the fourth-received tone signal. Hence, if the correct sequence has been entered, a logic 1 is clocked through to the Q output resulting in a "GOOD" output signal. However, if the correct sequence has not been entered, the logic 1 is clocked to the $\overline{Q}$ output resulting in a "BAD" output signal. The output of the counter 124 is also designated "4T" and is fed to the gate 55 of FIG. 2 as previously mentioned.

In this regard, it will be remembered that the fourth tone in the sequence may be any tone in the present example. However, it will be appreciated that any number of signals in any given sequence may be utilized, including any number of desired "don't care" or dummy signals at any point in the sequence, without departing from the invention.

The counter 124 is coupled to disable itself upon reaching the fourth count, so as to maintain the 4T signal at that point. This is done by way of an inverter 125 which is coupled back to one input of a two-input AND gate 126 the other input of which receives the DV signal for input to the count (C) input of the counter 124.

The reset signal R is also fed to the reset input (R) of each of the flip-flops 106, 110 and 114 and to the set (S) input of the flip-flop 122. In this regard, the flip-flop 122 is normally held in the set state, that is, with a logic 1 signal at the Q output, thus comprising the "GOOD" signal. Thus, the clocking of the positive 1 upon completion of the correct entry code merely has the effect of leaving the "GOOD" signal unchanged, whereas any incorrect attempt at entering the access code clocks the flip-flop 122 to produce the logic 1 or "BAD" at the $\overline{Q}$ output.

Each time a "BAD" signal is produced by flip-flop 122 it is utilized to clock or count a further break-in counter 128 illustrated in FIG. 4 to which attention is next invited. This break-in counter 128 is also preferably a decode counter of the type generally designated 4017. Any of the outputs of the counter 128 may be selected to correspond to the number of "BAD" attempts at which the access sequence detector of FIG. 3 will be disabled and an alternate access sequence detector shown in FIG. 5 will be enabled.

Accordingly, a selected output of the decode counter, here chosen as the "number four" output thereof (4) is tied to an enable line (EN2) for enabling the alternate access sequence detector of FIG. 5. At the same time an inverter buffer 130 changes the first enable line EN1 to a logic 0. This logic 0 is also fed back to the count or clock input of the break-in counter 128 by way of a suitable AND gate 132 in the same fashion as described above for the counter 124. This then holds the alternate access sequence detector in the enabled state. If, however, the correct entry or access sequence is detected by the first sequence detector of FIG. 3 previous to four "BAD" attempts, the reset line R resets the break-in counter 128 as indicated at the reset (R) input thereof.

In accordance with a preferred feature of the invention a suitable indicator such as an LED 134 may also be coupled by way of a suitable current limiting resistor 136 to be energized by the selected count output of the counter 128. This provides a visual indication of a number of break-in attempts and resulting selection of the alternate access sequence detector of FIG. 5.

Referring now to FIG. 5, the alternate access sequence detector is similar to the access sequence detector circuit of FIG. 3. However, the alternate access code or sequence is here chosen as 4, 5, 6, 7. In this regard, first, second and third flip-flops 140, 142 and 144 receive selected encoded signals from the DTMF 20 of FIG. 1 by way of suitable AND gates 146, 148 and 150. These gates are wired in the same fashion as described with respect to the circuit of FIG. 3 to appropriate ones of the outputs or lines 46a of FIG. 2. Additionally, the first gate 146 is wired to receive one input from a two-input AND gate 152, the other input of which receives the enable line EN2 from the break-in counter circuit of FIG. 4. Accordingly, the circuit of FIG. 5 is enabled or activated upon the production of the logic 1 signal at the EN2 output of FIG. 4 as just described.

In other respects, the first three selected members of the code sequence operate the first three flip-flops 140, 142 and 144 in the same fashion described above with reference to FIG. 3. In this regard, the DV signal feeds the clock input of the first flip-flop 140 and is ANDed at gate 151 with the Q output thereof to feed the clock input (C) of the second flip-flop 142. A similar AND gate 153 receives the DV line and Q output of flip-flop 142 and feeds the clock input (C) of the third flip-flop 144. The Q output of the last flip-flop 144 feeds the 20K line by way of a further pair of AND gates 154, 156 which incorporate a fourth digit or member of the code sequence for the sequence detector of FIG. 5.

Accordingly, the alternate sequence detector of FIG. 5 requires four predetermined encoded sequence members in the proper order to give the 20K signal. It will be remembered that this 20K signal alternatively activates the OR gate 120 which enables the continued production of the "GOOD" signal from the flip-flop 122 of FIG. 3. In the same fashion as the access sequence detector of FIG. 3, if the proper code is not entered in the proper sequence, a logic 0 will be produced at the 20K output, permitting the flip-flop 122 to be clocked simultaneously with decoding of the fourth-received tone to give the "BAD" signal.

Referring briefly to FIG. 6 one example of a suitable feedback circuit 30 for verifying operation of the control circuit of FIG. 2 is illustrated. In this regard, it will be remembered that the control system of FIG. 2, once accessed or enabled by the novel break-in prevention circuitry just described permits control of one or more devices or instruments in response to signals received over the telephone line 12 from any conventional pushbutton-type telephone receiver. Accordingly, the circuit of FIG. 6 is arranged to produce an audible "click" on the line 12 to this "sending" receiver. The instrument or device being controlled is indicated generally by the reference numeral 160.

In the illustrated embodiment, this instrument 160 is of the type which may be activated or turned "on" by the completion of a circuit thereto from a conventional AC line or household current indicated generally at 162, 164. Accordingly, the line 164 feeds a movable contact 166 of a relay 168. A normally open fixed contact 170 of this relay 166 is in turn coupled with the instrument 160, while the other side of the AC line 162 is coupled directly thereto. A suitable relay coil 172 is arranged for pulling the movable contactor 166 into engagement with the fixed contact 170 upon energization thereof, thus completing the circuit for turning the instrument 160 "on". Referring briefly to FIG. 2, the "1 on" output may be coupled directly to one side of the coil 172 for this purpose, the other side thereof being coupled with circuit ground.

In order to provide an audible click over the telephone line, the AC line 162 further feeds one side of an opto-coupler or opto-isolator 174 whose other side is also coupled with the fixed contact 170. Hence, the opto-coupler will be activated upon activation of the relay 168 for completing the circuit to the instrument 160. A resultant output signal from the opto-coupler 174 feeds a suitable Schmitt trigger 176 by way of a suitable RC filter 178, 180. The output of the Schmitt trigger is designated ACON and is coupled to the positive trigger input of a monostable multivibrator circuit 182 (MMV). The MMV is preferably of the type generally designated 4098.

The Q output of the MMV 182 provides the ANSR signal, which it will be remembered feeds one input of the exclusive-OR gate 95 of FIG. 2. It will further be remembered that such activation of the exclusive-OR gate 95 gives a suitable signal by way of buffer 88 for connecting and disconnecting the telephone line 12 by way of the relay 90. However, the MMV 182 is provided with a suitably short time constant, such that the ACON signal constitutes a brief pulse, only sufficient to momentarily deactivate and then reactivate the relay 90 of FIG. 2. Hence, an audible "click" is produced over the telephone line 12 upon completion of the AC connection to the controlled instrument 160.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

I claim:

1. A phone-line-linked, tone-operated control apparatus comprising: detecting means coupled to receive tone signals from said phone line, for detecting at least one predetermined sequence of predetermined tone signals and for producing a corresponding sequence detection signal; control means responsive to said sequence detection signal for producing a corresponding control signal; wherein said detecting means comprises first detecting means for producing a first detection signal in response to a first predetermined sequence of predetermined tone signals and a second detection signal in response to a second predetermined sequence of predetermined tone signals; wherein said control means is responsive to said first detection signal for producing a corresponding first control signal and responsive to said second detection signal for producing a corresponding second control signal; wherein said control means comprises dual state means capable of producting one of said first control signal and said second control signal at a time; and wherein said first and said second detecting means further include gating means coupled in circuit for disabling production of said first and said second detection signals respectively in response to said second control signal and said first control signal, respectively.

2. A control apparatus in accordance with claim 1 wherein said detecting means comprises tone decoding means responsive to said tone signals for producing digitally encoded signals corresponding in a predetermined fashion to said tone signals; and digital decoding means responsive to predetermined ones of said digitally encoded signals occurring in a predetermined sequence for producing said corresponding sequence detection signal.

3. A phone-line-linked, tone-operated control apparatus comprising: detecting means coupled to receive tone signals from said phone line, for detecting at least one predetermined sequence of predetermined tone signals and for producing a corresponding sequence detection signal; and control means responsive to said sequence detection signal for producing a corresponding control signal; wherein said detecting means comprises tone decoding means for converting each of said tone signals into a multiple-bit digital signal, logic gate means coupled to receive said multiple-bit digital signals and responsive to multiple-bit digital signals of predetermined logic content for producing gated output signals, and sequence detecting means coupled to said logic gate means for producing said sequence detection signal in response to production of said gated output signals in a predetermined sequence; and wherein said control means comprises flip-flop means capable of producing first state and second state output signals and responsive to each sequence detection signal for changing the state of its output signal, said output signals comprising said control signal.

4. A control apparatus in accordance with claim 3 wherein said detecting means includes means for detecting at least two predetermined sequences of predetermined tone signals and producing corresponding sequence detection signals; wherein said control means is responsive to each said sequence detection signal for changing state; and further including gating means coupled with said control means and with said sequence detecting means for preventing reception of a sequence detection signal at said control means in response to a corresponding control signal, thereby preventing said control means from changing state in response to consecutive repetition of the same sequence detection signal.

5. A phone-line-linked, tone-operated control apparatus comprising: detecting means coupled to receive tone signals from said phone line, for detecting at least one predetermined sequence of predetermined tone signals and for producing a corresponding sequence detection signal; control means responsive to said sequence detection signal for producing a corresponding control signal; access limiting circuit means coupled with said detecting means for preventing production of said sequence detection signal until an access sequence comprising a further predetermined sequence of predetermined tone signals is first received on said phone line; wherein said access limiting means includes gate means coupled with said detecting means for normally preventing response thereof to said tone signals, and counter means coupled to said gate means and responsive to said tone signals for causing said gate means to enable operation of said detecting means following a predetermined number of tone signals received thereby.

6. A control apparatus in accordance with claim 5 wherein said access limiting means further includes access sequence detecting means responsive to a predetermined number of tone signals consecutively received on said phone line other than said access sequence of producing a disabling signal; and disabling means coupled to said detecting means for preventing production of said sequence detection signal in response to said disabling signal.

7. A phone-line-linked, tone-operated control apparatus comprising: detecting means coupled to receive tone signals from said phone line, for detecting at least one predetermined sequence of predetermined tone signals and for producing a corresponding sequence detection signal; control means responsive to said sequence detection signal for producing a corresponding control signal; and access limiting circuit means coupled with said detecting means for preventing production of said sequence detection signal until an access sequence comprising a further predetermined sequence of predetermined tone signals is first received on said phone line; wherein said access limiting means further comprises a first access sequence detector responsive only to said access sequence, a second access sequence detector responsive only to a second access sequence comprising a different predetermined sequence of predetermined tone signals, and enabling circuit means for normally enabling said first access sequence detector and disabling said second access sequence detector and responsive to a predetermined number of sequences of tone signals not corresponding to said further predetermined sequence for disabling said first access sequence detector and enabling said second access sequence detector.

8. A control apparatus according to claim 6 further including gate means coupled to said answering means and responsive to said disabling signal for causing said answering means to disconnect said detecting means from said phone line.

9. A control apparatus in accordance with claim 5 and further including access sequence detecting means for producing a disabling signal in response to a predetermined number of tone signals not comprising said access sequence and gate means for disconnecting said detecting means from said phone line in response to said disabling signal.

10. A phone-line-linked, tone-operated control apparatus comprising: detecting means coupled to receive tone signals from said phone line, for detecting at least one predetermined sequence of predetermined tone signals and for producing a corresponding sequence detection signal; control means responsive to said sequence detection signal for producing a corresponding control signal; switching means responsive to said control signal for activating a given instrument under control; and feedback means coupled to said switching means for producing a verifying signal in response to operation of said switching means for activating said instrument under control; wherein said feedback means includes gate means coupled with said answering circuit means and responsive to said verifying signal for momentarily decoupling said detecting circuit means from said phone line and thereby producing an audible signal.

11. An access limiting apparatus for use with a phone-line-linked, tone-operated control apparatus and comprising: access sequence detecting means coupled to receive tone signals from said phone line, and responsive to a predetermined number of tone signals received on said phone line other than an access sequence comprising a predetermined sequence of predetermined tone signals for producing a disabling signal; disabling means coupled to said control apparatus for preventing operation thereof in response to said disabling signal; wherein said access limiting means further comprises a first access sequence detector responsive only to said access sequence, a second access sequence detector responsive only to a second access sequence comprising a different predetermined sequence of predetermined tone signals, and enabling circuit means for normally enabling said first access sequence detector and disabling said second access sequence detector and responsive to a predetermined number of sequences of tone signals not corresponding to said further predetermined sequence for disabling said first access sequence detector and enabling said second access sequence detector.

12. An access limiting apparatus in accordance with claim 11 and further including answering means for normally coupling said control apparatus to said phone line in response to a predetermined number of ring tones received on said phone line; and gate means for disconnecting said control apparatus from said phone line in response to said disabling signal.

13. A control apparatus in accordance with claim 1 and further including means for coupling said apparatus in parallel with a telephone receiver for permitting production of said sequence detection signal and production of said control signal simultaneously with conversation over said telephone receiver.

14. A control apparatus in accordance with claim 1 and further including decoupling means responsive to a remotely located transmitter going off the telephone line for disconnecting the control apparatus from the telephone line.

15. A phone-line-linked, tone-operated control apparatus comprising: detecting means coupled to receive tone signals from said phone line, for detecting at least one predetermined sequence of predetermined tone signals and for producing a corresponding sequence detection signal; control means responsive to said sequence detection signal for producing a corresponding control signal; and access limiting circuit means coupled with said detecting means for preventing production of said sequence detection signal until an access sequence comprising a further predetermined sequence of predetermined tone signals is first received on said phone line; wherein said access limiting circuit means comprises gating circuit means for producing a gate signed in response to tone signals making up said predetermined access, sequence, counter means for producing a count signal upon counting a predetermined number of received tone signals greater in number than the number of tone signals in said access sequence, and disabling circuit means responsive to said count signal and said gate signal for disabling production of said sequence detection signal when said access sequence is not present in said predetermined number of received tone signals; whereby a selected number of additional, arbitrary tone signals may be received in addition to the signals of said access sequence without disabling production of said sequence detecting signals, said selected number of additional signals and the number of signals in said access sequence together equalling the number of signals counted by said counter meams.

16. A control apparatus in accordance with claim 1 and further including means for coupling said sequence detecting means to said phone line in response to a predetermined number of ring tones received on said phone line.

17. An access limiting apparatus according to claim 11 and further including answering means coupled to said phone line and responsive to a predetermined number of ring tones received on said phone line for coupling said control apparatus to said phone line; and gate means coupled to said answering means and responsive to said disabling signal for causing said answering means to disconnect said control apparatus from said phone line.

* * * * *

REEXAMINATION CERTIFICATE (2691th)

United States Patent [19]
Jackson

[11] B1 4,596,900
[45] Certificate Issued Oct. 10, 1995

[54] PHONE-LINE LINKED, TONE-OPERATED CONTROL DEVICE

[76] Inventor: Philip S. Jackson, 5305 N. Neenah, Chicago, Ill. 60656

Reexamination Request
No. 90/003,496, Jul. 15, 1994
No. 90/003,680, Jan. 3, 1995

Reexamination Certificate for:
Patent No.: 4,596,900
Issued: Jun. 24, 1986
Appl. No.: 507,702
Filed: Jun. 23, 1983

[51] Int. Cl.$^6$ ............... H04M 11/00; H04M 1/64
[52] U.S. Cl. ............... 379/105; 379/77; 379/102
[58] Field of Search ................ 379/102, 104, 379/105, 97, 77, 88, 89, 67, 200

[56] References Cited

U.S. PATENT DOCUMENTS 4,095,050   6/1978   Beachem et al. ............... 379/102

*Primary Examiner*—Jason Chan

[57] ABSTRACT

A phone-line-linked, tone-operated control apparatus in accordance with the invention comprises a detecting circuit coupled to a telephone line for detecting at least one predetermined sequence of predetermined tone signals received on the telephone line and for producing a corresponding sequence detection signal. An additional control circuit is responsive to the sequence detection signal for producing a corresponding control signal. Preferably, a break-in prevention circuit prevents access to the control apparatus unless a predetermined access code is first given.

17 Claims

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5–9, 11–12, 17 is confirmed.

Claims 1, 3, 10 and 15 are determined to be patentable as amended.

Claims 2, 4, 13, 14 and 16, dependent on an amended claim, are determined to be patentable.

1. A phone-line-linked, tone-operated control apparatus *for remotely controlling various functions of at least one device, said apparatus* comprising: detecting means coupled to receive tone signals from said phone line, for detecting at least one predetermined sequence of predetermined tone signals and for producing a corresponding sequence detection signal; control means responsive to said sequence detection signal for producing a corresponding control signal; wherein said detecting means comprises first detecting means for producing a first detection signal in response to *the reception of* a first predetemined sequence of predetermined tone signals and *second detecting means for producing* a second detection signal in response to *the reception of* a second predetermined sequence of predetermined tone signals; wherein said control means is responsive to said first detection signal for producing a corresponding first control signal and responsive to said second detection signal for producing a corresponding second control signal; wherein said control means comprises dual state means [capable of] *for* producing *only* one of a first control signal and said second control signal at a time; and wherein said first and said second detecting means further include gating means coupled in circuit for disabling production of said first and said second detection signals respectively in response to said second control signal and said first control signal, respectively, *whereby said apparatus cannot produce said first detection signal and said second detection signal at the same time.*

3. A phone-line-linked, tone-operated control apparatus comprising: detecting means coupled to receive *a plurality of* tone signals from said phone line, for detecting at least one predetermined sequence of predetermined tone signals and for producing a corresponding sequence detection signal; and control means responsive to said sequence detection signal for producing a corresponding control signal; wherein said detecting means comprises tone decoding means for converting each *received one* of said *plurality of* tone signals into [a] *an encoded* multiple-bit digital signal, *with each said encoded multiple-bit digital signal having a total number of bits substantially less than the total number of tone signals in said plurality of tone signals*, logic gate means coupled to receive said *encoded* multiple-bit digital signals and responsive to *said encoded* multiple-bit digital signals of predetermined logic content for producing gated output signals, and sequence detecting means coupled to said logic gate means for producing said *corresponding* sequence detection signal in response to production of said gated output signals in a predetermined sequence; and wherein said control means comprises flip-flop means [capable of] *for* producing first state and second state output signals and responsive to each *different* sequence detection signal for changing the state of its *corresponding* output signal, said output signals comprising said control signal.

10. A phone-line-linked, tone-operated control apparatus comprising: detecting means coupled to receive tone signals from said phone line, for detecting at least one predetermined sequence of predetermined tone signals and for producing a corresponding sequence detection signal; control means responsive to said sequence detection signal for producing a corresponding control signal; switching means responsive to said control signal for activating a given instrument under control; and feedback means coupled to said switching means for producing a verifying signal in response to operation of said switching means for activating said instrument under control; wherein said feedback means includes gate means coupled with [said] answering circuit means and responsive to said verifying signal for momentarily decoupling said detecting circuit means from said phone line and thereby producing an audible signal.

15. A phone-line-linked, tone-operated control apparatus comprising: detecting means coupled to receive tone signals from said phone line, for detecting at least one predetermined sequence of predetermined tone signals and for producing a corresponding sequence detection signal; control means responsive to said sequence detection signal for producing a corresponding control signal; and access limiting circuit means coupled with said detecting means for preventing production of said sequence detection signal until an access sequence comprising a further predetermined sequence of predetermined tone signals is first received on said phone line; wherein said access limiting circuit means comprises gating circuit means for producing a gate [signed] *signal* in response to tone signals making up said predetermined access sequence, counter means for producing a count signal upon counting a predetermined number of received tone signals greater in number than the number of tone signals in said access sequence, and disabling circuit means responsive to said count signal and said gate signal for disabling production of said sequence detection signal when said access sequence is not present in said predetermined number of received tone signals; whereby a selected number of additional, arbitrary tone signals may be received in addition to the signals of said access sequence without disabling production of said sequence detecting signals, said selected number of additional signals and the number of signals in said access sequence together equalling the number of signals counted by said counter meams.

* * * * *

REEXAMINATION CERTIFICATE (3301th)
United States Patent [19]
Jackson

[11] B2 4,596,900
[45] Certificate Issued Aug. 26, 1997

[54] PHONE-LINE-LINKED, TONE-OPERATED CONTROL DEVICE

[76] Inventor: Philip S. Jackson, 5305 N. Neenah, Chicago, Ill. 60656

Reexamination Request:
No. 90/003,985, Oct. 3, 1995

Reexamination Certificate for:
Patent No.: 4,596,900
Issued: Jun. 24, 1986
Appl. No.: 507,702
Filed: Jun. 23, 1983

Reexamination Certificate B1 4,596,900 issued Oct. 10, 1995

Certificate of Correction issued Oct. 10, 1995.

[51] Int. Cl.$^6$ ............................ H04M 11/00; H04M 1/64
[52] U.S. Cl. ............................ 379/105; 379/77; 379/102
[58] Field of Search ............................ 379/105, 77, 102, 379/104, 97, 88, 89, 67, 200

[56] References Cited

U.S. PATENT DOCUMENTS

| | | | |
|---|---|---|---|
| Re. 33,369 | 10/1990 | Hashimoto | 379/104 |
| 1,778,980 | 10/1930 | Mc Keldin et al. | |
| 2,005,788 | 6/1935 | Keiser | |
| 2,154,722 | 4/1939 | Bloxson | |
| 2,261,420 | 11/1941 | Shively et al. | |
| 2,374,842 | 5/1945 | Shively et al. | |
| 2,393,272 | 1/1946 | Van Deventer | |

(List continued on next page.)

FOREIGN PATENT DOCUMENTS

| | | |
|---|---|---|
| 0008220A1 | 2/1980 | European Pat. Off. |
| 2224629 | 4/1974 | France |
| 49-37504 | 4/1974 | Japan |
| 49-37505 | 4/1974 | Japan |
| 50-3472 | 2/1975 | Japan |
| 50-27404 | 3/1975 | Japan |
| 52-44993 | 4/1977 | Japan |
| 53-42609 | 4/1978 | Japan |
| 53-137389 | 11/1978 | Japan |
| 56-35562 | 4/1981 | Japan |
| 1482628 | 8/1977 | United Kingdom |
| 2065419 | 6/1981 | United Kingdom |

OTHER PUBLICATIONS

Article entitled "Making A Data Terminal Out Of The Touch–Tone Telephone" by Robert Broomfield, et al., Electronics magazine/Jul. 3, 1980.

Article entitled "Build A Touch Tone Decoder For Remote Control" by Steve Ciarcia, BYTE magazine/Dec., 1981.

*Practical Digital Design Using Ics*, First Edition, 1977, pp. 150–165, Joseph D. Greenfield.

*Practical Digital Design Using Ics*, Second Edition, 1983, pp. 158–172, Joseph D. Greenfield.

*Primary Examiner*—Jason Chan

[57] ABSTRACT

A phone-line-linked, tone-operated control apparatus in accordance with the invention comprises a detecting circuit coupled to a telephone line for detecting at least one predetermined sequence of predetermined tone signals received on the telephone line and for producing a corresponding sequence detection signal. An additional control circuit is responsive to the sequence detection signal for producing a corresponding control signal. Preferably, a break-in prevention circuit prevents access to the control apparatus unless a predetermined access code is first given.

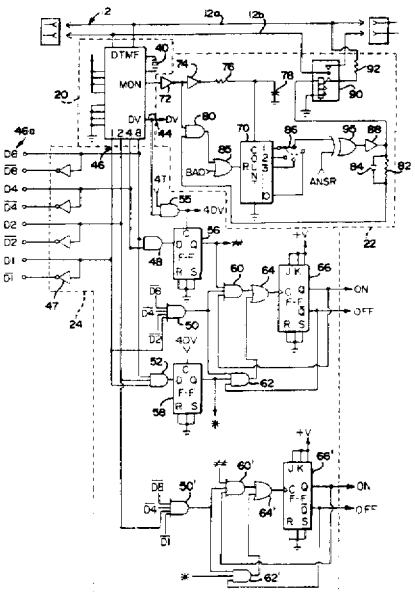

U.S. PATENT DOCUMENTS

| | | | |
|---|---|---|---|
| 2,533,234 | 12/1950 | Edwards . | |
| 2,539,139 | 1/1951 | Jordanoff et al. . | |
| 2,549,548 | 4/1951 | Von Zimmermann . | |
| 2,799,726 | 7/1957 | Van Deventer et al. . | |
| 3,024,452 | 3/1962 | Leonard . | |
| 3,049,592 | 8/1962 | Waldman . | |
| 3,076,059 | 1/1963 | Meacham et al. . | |
| 3,077,577 | 2/1963 | Malone et al. . | |
| 3,080,547 | 3/1963 | Cooper . | |
| 3,109,071 | 10/1963 | Mitchell et al. . | |
| 3,274,584 | 9/1966 | Morgan et al. . | |
| 3,320,490 | 5/1967 | Beck et al. . | |
| 3,371,165 | 2/1968 | Earle et al. . | |
| 3,383,467 | 5/1968 | New et al. . | |
| 3,383,469 | 5/1968 | Goodman . | |
| 3,436,483 | 4/1969 | Blane . | |
| 3,542,962 | 11/1970 | Morgan et al. . | |
| 3,548,102 | 12/1970 | Schaum et al. . | |
| 3,552,520 | 1/1971 | Naubereit . | |
| 3,553,376 | 1/1971 | Bogaart et al. . | |
| 3,577,080 | 5/1971 | Cannalte . | |
| 3,581,283 | 5/1971 | Reddel | 340/171 |
| 3,584,155 | 6/1971 | Koster . | |
| 3,587,051 | 6/1971 | Hovey | 340/164 R |
| 3,591,711 | 7/1971 | De Groat . | |
| 3,593,816 | 7/1971 | Kazaoka | 180/113 |
| 3,600,517 | 8/1971 | Goodman . | |
| 3,614,326 | 10/1971 | Cameron . | |
| 3,622,992 | 11/1971 | Schoenwitz . | |
| 3,633,167 | 1/1972 | Hedin | 340/164 |
| 3,641,396 | 2/1972 | Kossen et al. | 317/134 |
| 3,641,498 | 2/1972 | Hedin | 340/164 R |
| 3,647,971 | 3/1972 | Cushman et al. . | |
| 3,647,973 | 3/1972 | James et al. . | |
| 3,652,795 | 3/1972 | Wolf et al. . | |
| 3,665,162 | 5/1972 | Yamamoto et al. | 235/61.7 B |
| 3,675,513 | 7/1972 | Flanagan et al. . | |
| 3,691,396 | 9/1972 | Hinrichs | 307/40 |
| 3,702,904 | 11/1972 | Bard . | |
| 3,710,316 | 1/1973 | Kromer | 340/63 |
| 3,715,518 | 2/1973 | Campbell et al. . | |
| 3,723,753 | 3/1973 | Davis | 307/41 |
| 3,731,076 | 5/1973 | Nagata et al. | 235/61.7 B |
| 3,743,945 | 7/1973 | Sellari, Jr. | 328/28 |
| 3,751,718 | 8/1973 | Hanchett, Jr. | 317/134 |
| 3,754,164 | 8/1973 | Zoizy | 317/134 |
| 3,754,213 | 8/1973 | Morroni et al. | 340/147 |
| 3,761,682 | 9/1973 | Barnes et al. | 235/61.7 B |
| 3,764,859 | 10/1973 | Wood et al. | 317/134 |
| 3,812,403 | 5/1974 | Gartner | 317/134 |
| 3,812,462 | 5/1974 | Crossland et al. | 340/163 |
| 3,814,840 | 6/1974 | Lubarsky, Jr. et al. . | |
| 3,818,145 | 6/1974 | Hanway . | |
| 3,825,687 | 7/1974 | Waldman . | |
| 3,829,616 | 8/1974 | Blouch . | |
| 3,831,065 | 8/1974 | Martin et al. | 317/134 |
| 3,836,959 | 9/1974 | Pao et al. | 340/148 |
| 3,842,208 | 10/1974 | Paraskevakos . | |
| 3,846,622 | 11/1974 | Meyer | 235/61.7 B |
| 3,857,018 | 12/1974 | Stark et al. | 235/61.7 B |
| 3,866,173 | 2/1975 | Moorman et al. | 340/149 A |
| 3,868,640 | 2/1975 | Binnie et al. | 340/151 |
| 3,870,821 | 3/1975 | Steury . | |
| 3,871,474 | 3/1975 | Tomlinson et al. | 180/113 |
| 3,872,254 | 3/1975 | Murata et al. . | |
| 3,878,511 | 4/1975 | Wagner | 340/147 |
| 3,885,408 | 5/1975 | Clark, Jr. | 70/278 |
| 3,893,073 | 7/1975 | Angello | 340/147 |
| 3,902,016 | 8/1975 | Blouch . | |
| 3,904,826 | 9/1975 | Murata et al. | 379/77 |
| 3,906,460 | 9/1975 | Halpern | 340/172.5 |
| 3,912,869 | 10/1975 | Ullakko . | |
| 3,919,504 | 11/1975 | Crosley et al. . | |
| 3,927,264 | 12/1975 | Fish et al. . | |
| 3,936,617 | 2/1976 | Bolgiano . | |
| 3,943,291 | 3/1976 | Okamura . | |
| 3,953,769 | 4/1976 | Sopko . | |
| 3,959,603 | 5/1976 | Nilssen et al. . | |
| 3,976,840 | 8/1976 | Cleveland et al. . | |
| 3,979,562 | 9/1976 | Rice . | |
| 3,991,274 | 11/1976 | Darwood | 379/77 |
| 3,992,587 | 11/1976 | Puckett et al. | 379/96 |
| 4,002,837 | 1/1977 | Ebner et al. . | |
| 4,004,276 | 1/1977 | Robinson et al. | 340/171 A |
| 4,005,271 | 1/1977 | Urayama . | |
| 4,006,316 | 2/1977 | Bolgiano | 379/105 |
| 4,011,411 | 3/1977 | Nishimura . | |
| 4,016,360 | 4/1977 | Cane . | |
| 4,021,796 | 5/1977 | Fawcett, Jr. et al. | 340/274 C |
| 4,029,913 | 6/1977 | Gunderson . | |
| 4,042,787 | 8/1977 | Richards . | |
| 4,055,808 | 10/1977 | Holsinger et al. | 325/67 |
| 4,058,678 | 11/1977 | Dunn et al. . | |
| 4,064,367 | 12/1977 | O'Malley . | |
| 4,066,847 | 1/1978 | Giordano . | |
| 4,087,638 | 5/1978 | Hayes et al. . | |
| 4,092,524 | 5/1978 | Moreno . | |
| 4,093,823 | 6/1978 | Chu | 370/92 |
| 4,095,050 | 6/1978 | Beachem et al. | 379/104 |
| 4,095,239 | 6/1978 | Gerry | 340/147 |
| 4,100,534 | 7/1978 | Shifflet, Jr. | 340/149 A |
| 4,102,493 | 7/1978 | Moreno | 235/419 |
| 4,105,156 | 8/1978 | Dethloff | 235/441 |
| 4,112,264 | 9/1978 | Abramson et al. . | |
| 4,113,986 | 9/1978 | Clement et al. . | |
| 4,117,270 | 9/1978 | Lesea . | |
| 4,121,053 | 10/1978 | Dick | 379/104 |
| 4,122,305 | 10/1978 | Fish et al. . | |
| 4,122,306 | 10/1978 | Friedman et al. | 379/73 |
| 4,124,773 | 11/1978 | Elkins . | |
| 4,130,732 | 12/1978 | Giovagnoni . | |
| 4,135,150 | 1/1979 | Quigley | 379/351 |
| 4,142,097 | 2/1979 | Ulch | 235/382 |
| 4,153,818 | 5/1979 | Goodloe et al. . | |
| 4,158,110 | 6/1979 | Ullakko et al. . | |
| 4,160,131 | 7/1979 | Kaul et al. . | |
| 4,174,517 | 11/1979 | Mandel | 340/310 A |
| 4,181,909 | 1/1980 | Pyeatte et al. | 340/147 SY |
| 4,188,511 | 2/1980 | Smith et al. . | |
| 4,189,712 | 2/1980 | Lemelson | 340/149 A |
| 4,194,089 | 3/1980 | Hashimoto | 379/96 |
| 4,197,524 | 4/1980 | Salem | 340/147 |
| 4,205,325 | 5/1980 | Haygood et al. | 340/147 |
| 4,206,491 | 6/1980 | Ligman et al. | 361/172 |
| 4,211,919 | 7/1980 | Ugon | 235/487 |
| 4,218,589 | 8/1980 | Pitroda et al. | 370/13 |
| 4,219,699 | 8/1980 | Nilssen et al. | 379/63 |
| 4,232,296 | 11/1980 | Filipovic | 340/167 R |
| 4,249,245 | 2/1981 | Nakanishi et al. | 364/710 |
| 4,251,692 | 2/1981 | Waldman . | |
| 4,256,955 | 3/1981 | Giraud et al. | 235/380 |
| 4,258,236 | 3/1981 | Conklin et al. . | |
| 4,277,837 | 7/1981 | Stuckert | 364/900 |
| 4,289,934 | 9/1981 | Pitroda et al. . | |
| 4,292,475 | 9/1981 | Hill et al. . | |
| 4,304,968 | 12/1981 | Klausner et al. . | |
| 4,313,038 | 1/1982 | Nilssen et al. . | |
| 4,319,337 | 3/1982 | Sander et al. | 364/900 |
| 4,320,256 | 3/1982 | Freeman . | |
| 4,336,422 | 6/1982 | Mellon . | |
| 4,341,951 | 7/1982 | Benton | 235/379 |
| 4,352,958 | 10/1982 | Davis et al. . | |

| | | | |
|---|---|---|---|
| 4,353,502 | 10/1982 | Myers | 236/47 |
| 4,356,545 | 10/1982 | West | 364/200 |
| 4,366,348 | 12/1982 | Pope . | |
| 4,385,206 | 5/1983 | Bradshaw et al. . | |
| 4,386,266 | 5/1983 | Chesarek | 235/380 |
| 4,387,272 | 6/1983 | Castro et al. . | |
| 4,392,218 | 7/1983 | Plunkett, Jr. | 369/29 |
| 4,393,277 | 7/1983 | Besen et al. . | |
| 4,403,119 | 9/1983 | Conklin et al. | 379/5 |
| 4,408,119 | 10/1983 | Decavele | 235/382 |
| 4,421,954 | 12/1983 | Mita et al. | 379/82 |
| 4,426,555 | 1/1984 | Underkoffler | 379/96 |
| 4,427,848 | 1/1984 | Tsakanikas | 379/96 |
| 4,427,980 | 1/1984 | Fennell et al. | 340/85.52 |
| 4,430,755 | 2/1984 | Nadir et al. | 455/77 |
| 4,431,867 | 2/1984 | Heatherington . | |
| 4,436,958 | 3/1984 | Hansen et al. | 379/103 |
| 4,436,959 | 3/1984 | Nakatsuyama et al. | 379/73 |
| 4,438,295 | 3/1984 | Hales . | |
| 4,440,977 | 4/1984 | Pao et al. . | |
| 4,442,319 | 4/1984 | Treidl . | |
| 4,449,040 | 5/1984 | Matsuoka et al. | 235/380 |
| 4,453,041 | 6/1984 | Castro et al. | 379/373 |
| 4,453,074 | 6/1984 | Weinstein | 235/380 |
| 4,455,453 | 6/1984 | Parasekvakos et al. . | |
| 4,467,144 | 8/1984 | Wilkerson et al. . | |
| 4,467,148 | 8/1984 | Stafford et al. . | |
| 4,469,915 | 9/1984 | Lax et al. | 379/74 |
| 4,475,009 | 10/1984 | Rais et al. . | |
| 4,477,806 | 10/1984 | Mochida et al. | 340/825.32 |
| 4,488,274 | 12/1984 | Plunkett, Jr. | 369/24 |
| 4,491,690 | 1/1985 | Daley | 379/105 |
| 4,503,288 | 3/1985 | Kessler . | |
| 4,518,827 | 5/1985 | Sagara . | |
| 4,525,712 | 6/1985 | Okano et al. . | |
| 4,531,740 | 7/1985 | Green et al. | 340/853.1 |
| 4,540,851 | 9/1985 | Hashimoto | 273/148 B |
| 4,540,856 | 9/1985 | Fujii et al. . | |
| 4,549,044 | 10/1985 | Durham . | |
| 4,562,483 | 12/1985 | Kurokawa et al. | 358/257 |
| 4,570,223 | 2/1986 | Yoshimoto | 364/405 |
| 4,578,540 | 3/1986 | Borg et al. . | |
| 4,585,904 | 4/1986 | Mincone et al. . | |
| 4,591,664 | 5/1986 | Freeman . | |

OTHER PUBLICATIONS

Dorol 320T Service Manual (Undated, partial copy only), Compact Cassette Remote Telephone/Answering Recording Machine.

*CMOS Integrated Circuits*, National Semiconductor Corp., Mar. 1975, pp. 173–175.

*Digital Integrated Circuits*, National Semiconductor Corp., Jan. 1974, pp. 1–9, 1–10, 1–13, 1–14, 1–15, 1–16, 1–28, 1–29, 1–56 and 1–57.

1980 *Electronics* Article, "Making a Data Terminal Out Of A Touch Tone Telephone".

1981 *BYTE* Article, "Build A Touch–Tone Decoder For Remote Control".

Microcomputer and Repeaters, 73 Magazine, Aug. 1977.

A Modular Control Unit—Just for Repeaters, QST Magazine, May 1978.

A First–Class Touch–Tone Encoder, QST Magazine, Feb. 1979.

Pivotrol Corp. Advertisement, *Nebraska Farmer*, May 6, 1978 at p. 75.

Pivotrol Corp. Advertisement, *Nebraska Farmer*, Apr. 15, 1978 at p. 87.

Pivotrol Corp. Advertisement, *The Dakota Farmer*, Aug. 1978 at p. 58.

Pivotrol Corp. Advertisement, *Nebraska Farmer*, Jun. 3, 1978 at p. 47.

Pivotrol Control Option Owner's Guide Model CTL–1, Pivotrol Corporation.

Pivotrol Corporation Advertisement, *Irrigation Age*, Jul.–Aug. 1978 at p. 54.

Pivotrol Center Pivot Irrigation Monitor and Control System, Owner's Manual, Ron Siffring, Pivotrol Serial No. 105.

Monroe Electronics Inc. brochure Model 3069 Dual Tone Signal Detector, 1975.

Interface Technology Product brochure for Model 720 and 721 Portable Remote Data Entry Terminal.

Interface Technology Product brochure for Model 730 Desktop Remote Data Entry Terminal–Buffered.

Interface Technology Product brochure for Model 722 16 Key Portable Remote Data Entry Terminal.

Ledex Inc. Product brochure for Model MD 42C Touch-–Tone decoder module, 1970.

National Semiconductor Corporation, Linear Integrated Circuits Catalogue.

Signetics Corporation, Digital Linear MOS Application Handbook, 1974.

Signetics Corporation, Digital Linear MOS Data Handbook, 1974.

Motorola Semiconductor Products, Inc., Phase–Locked Loop Systems Data Book (2d. ed. Aug. 1973).

Components For Design, *Electromechanical Design*, p. 18, et seq.

Pivotrol Advertisement dated Sep. 11, 1975 for Friday, Sep. 19, 1975 demonstration of Pivotrol.

Sikorski Electric Pivotrol Advertisement, *The Badger Commentator*, Jan. 1977 at p. 9.

First there was Dial–a–Prayer; Now there's Dial–a–Shower, *The Grower*, Mar. 1978 at p. 48.

Irrigation Monitor, *Farm Industry News*, Feb. 1977 at pp. 50–52.

Irrigator's Phone 'Dials' Water On, *Sunday Omaha World Herald*, Jul. 25, 1976.

Dial '0' for Water, *Irrigation Age*, vol. II, No. 3, Nov.–Dec. 1976 at p. 20.

He's "Hired" Telephone to Help Him Irrigate, *Nebraska Farmer*, Aug. 21, 1976 at p. 11.

Pivotrol Dealer's Installation Guide.

Pivotrol Center Pivot Monitor & Control System flyer.

Pivotrol Center Pivot Users flyer.

Pivotrol Center Pivot Monitor & Control System flyer.

"Pivotrol" Irrigation Monitoring & Control System pamphlet.

Pivotrol Corporation letter to "Dear Irrigator".

Pivotrol System On Display at Staples Farm, *The Staples World*, vol. 86, No. 26, Aug. 19, 1977.

The Staples Irrigation Center Pivotrol Irrigation Monitor and Control System flyer.

They Irrigate By Phone, *Farm Journal*, Mid–Mar. 1977, p. D–1.

A Computer–Controlled Talking Repeater, *73 Magazine*, Ed Ingber, Oct. 1980.

A Computer–Controlled Talking Repeater, *73 Magazine*, Ed Ingber, Nov. 1980.

A Computer–Controlled Talking Repeater, *73 Magazine*, Ed Ingber, Dec. 1980.

Integrated–Circuit Sequential Switching for Touch–Tone Repeater Control, *Ham Radio*, R.B. Shreve, Jun. 22, 1972.

247B Telephone Unit "Touch–Tone" Adapter, Identification Installation and Connectors, *Bell System Practices*, Feb. 1966.

Microprocessor–based Repeater Controller, *Ham Radio Magazine*, Mar. 1982 at p. 12.

Build a Touch–Tone Decoder for Remote Control, (1981), by Steve Ciarcia, *Byte Magazine*. [Relied Upon By Matsushita In Third Reexamination].

RC–850 Repeater Controller Owners Manual (Firmware Vers. 1.4) Jul. 1992.

DIGITONE—"Application Notes and Catalog" (1970).

FM and REPEATERS for the Radio Amateur (1972).

The Microprocessor And Repeater Control, *QST Magazine*, Feb. 1979.

A CMOS Control Circuit For Repeaters, *QST Magazine*, Mar. 1979.

Personalize Your Repeater With a Voice ID, *73 Magazine*, Jan. 1980.

Spectrum Communications Advertisement, *73 Magazine*, Jan. 1980.

A Universal Touch–Tone Decoder, *QST Magazine*, Mar. 1980.

Spectrum Communications Advertisement, *73 Magazine*, Apr. 1980.

Product Review Of The Spectrum Communications TTC–100 Touch–Tone Decoder/Control Board, *73 Magazine*, May 1980.

A Telephone–Line Repeater—Control Device, *QST Magazine*, Jun. 1980.

A CMOS Command Decoder For Repeaters And Remote Bases, *QST Magazine*, Oct. 1980.

Put "The Rep" In Your Repeater—An Automatic Autopatch Dialer, *73 Magazine*, Jan. 1981.

Spectrum Communications Advertisement, *73 Magazine*, Feb. 1981.

Under Software Control—A Repeater Control System With Minimal Hardware, *73 Magazine*, Feb. 1981.

Phone–line Interface—Do It Solid–State Style, *QST Magazine*, Oct. 1981.

Spectrum Communications Advertisement, *73 Magazine*, Jan. 1982.

The DTMF "Easy–Ceiver", *QST Magazine*, Jan. 1982.

Spectrum Communications Advertisement, *73 Magazine*, Mar. 1982.

Dayton HAMVENTION Advertisement, *73 Magazine*, Apr. 1982.

RC–850 Repeater Controller and related advertisement, *73 Magazine*, May 1982.

Not Just Another Decoder, *QST Magazine*, Jun. 1982.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN:

Column 6, lines 36–58:

It will be recognized from the foregoing that additional instruments or apparatus may be similarly provided with "on" and "off" control signals in response to additional, different selected sequences from the DTMF 20. For example, since the # and * decoded outputs are already available as the first in a two-signal sequence at the Q outputs of flip-flops 56 and 58, these may be utilized with other decoded digit tone signals to control further instruments or devices. That is, further gates such as AND gate 50 (*e.g, 50'*) may be used to detect or decode binary signals corresponding to other digits. Additionally, similar gates such as the gate 60 (*e.g., 60' and 62'*) may then be connected to receive the # and * outputs as well as the further decoded digit outputs so as to drive further flip-flops such as the flip-flop 66 (*e.g., 66'*) in exactly the same fashion (*e.g., using OR gate 64' and the feedback signals from the Q and Qbar outputs of flip-flop 66' are fed to the third input of AND gates 60' and 62', respectively, as discussed hereinabove with respect to OR gate 64, flip-flop 66 and AND gates 60 and 62*) as described above so as to provide on and off control signals for additional instruments. For example, *, 2 and #, 2 might be used to control a second instrument and so forth by the simple expedient of a repetition of only a small part of the circuitry of FIG. 2. Other codes may of course be utilized by duplicating more of the decoding and control logic circuit 24 of FIG. 2, if entirely different on and off codes are desired.

THE DRAWING FIGURES HAVE BEEN CHANGED AS FOLLOWS:

AND gates 50', 60' and 62', flip-flop 66' and OR gate 64' have been added to FIG. 2.

AS A RESULT OF REEXAMINATION, IT HAS BEEN DETERMINED THAT:

Claims 1, 3, 4, 5, 7, 8, 10, 11 and 15 are determined to be patentable as amended.

Claims 2, 6, 9, 12, 13, 14, 16 and 17, dependent on an amended claim, are determined to be patentable.

New claims 18–116 are added and determined to be patentable.

1. A phone-line-linked, tone-operated control apparatus for remotely controlling various functions of at least one device, said apparatus comprising:
 detecting means coupled to receive tone signals from said phone line,
  for detecting at least one predetermined sequence of predetermined tone signals and
  for producing a corresponding sequence detection signal;
 control means responsive to said sequence detection signal for producing a corresponding control signal;
 wherein said detecting means comprises
  first detecting means
   for producing a first detection signal in response to the reception of a first predetermined sequence of predetermined tone signals and
  second detecting means
   for producing a second detection signal in response to the reception of a second predetermined sequence of predetermined tone signals;
 wherein said control means is
  responsive to said first detection signal for producing a corresponding first control signal and
  responsive to said second detection signal for producing a corresponding second control signal;
 wherein said control means comprises
  dual state means
   for producing only one of [a] *said* first control signal and said second control signal at a time; and
 wherein said first and said second detecting means further include
  gating means
   coupled in circuit
    for disabling production of said first and said second detection signals respectively
    in response to said second control signal and said first control signal, respectively,
    whereby said apparatus cannot produce said first detection signal and said second detection signal at the same time.

3. A phone-line-linked, tone-operated control apparatus *for remotely and selectively controlling a plurality of operations, said operations being bistable by having only two mutually-exclusive stable operating conditions,* said apparatus comprising:
 detecting means coupled to receive a plurality of tone signals from said phone line,
  for detecting at least one predetermined sequence of predetermined tone signals and
  for producing a corresponding sequence detection signal; and
 control means responsive to said sequence detection signal for producing a corresponding control signal;
 wherein said detecting means comprises
  tone decoding means
   for converting each received one of said plurality of tone signals into an encoded multiple-bit digital signal, with each said encoded multiple-bit digital signal having a total number of bits substantially less than the total number of tone signals in said plurality of tone signals,
  logic gate means
   coupled to receive said encoded multiple-bit digital signals and responsive to said encoded multiple-bit digital signals of predetermined logic content for producing gated output signals, and
  sequence detecting means
   coupled to said logic gate means
    for producing said corresponding sequence detection signal response to production of said gated output signals in a predetermined sequence; and
 wherein said control means comprises
  flip-flop means [for] *associated with each said bistable operation, with said flip-flop means* producing first state and second state output signals *for each said bistable operation,*
*said first state output signal corresponding to one of said mutually-exclusive operating conditions, and said second state output signal corresponding to the other of said mutually-exclusive operating conditions,* and wherein said flip-flop means
is responsive to [each different] *a* sequence detection signal *selectively associated with one of said conditions of fewer than all of said bistable operations*
for changing [the state of its corresponding output signal,] *from said first state output signal to said second state output signal for said fewer than all of said bistable operations and*
*is responsive to a different sequence detection signal selectively associated with the other one of said conditions of fewer than all of said bistable operations*
*for changing from said second state output signal to said first state output signal for said fewer than all of said bistable operations, and*
maintaining the state of said flip-flop means until and if and only if said flip-flop means responds to a sequence detection signal *selectively associated with the other of said conditions of fewer than all of said bistable operations,*
said *first and second state* output signals comprising said control signal.

4. A control apparatus in accordance with claim 3 wherein said detecting means includes
means for detecting at least two predetermined sequences of predetermined tone signals and producing corresponding sequence detection signals;
wherein said control means is responsive to each said sequence detection signal for changing state; and
further including
gating means
coupled with said control means and with said sequence detecting means
for preventing reception of [a] *one of said corresponding* sequence detection [signal] *signals* at said control means in response to a corresponding control signal,
thereby preventing said control means from changing state in response to consecutive repetition of the same *corresponding* sequence detection signal.

5. A phone-line-linked, tone-operated control apparatus comprising:
detecting means coupled to receive tone signals from said phone line,
for detecting at least one predetermined sequence of predetermined tone signals and
for producing a corresponding sequence detection signal;
control means responsive to said sequence detection signal
for producing a corresponding control signal;
access limiting circuit means
coupled with said detecting means
for preventing production of said sequence detection signal
until an access sequence comprising
a further predetermined sequence of predetermined tone signals is first received on said phone line;
wherein said access limiting *circuit* means includes gate means
coupled with said detecting means
for normally preventing response thereof to said tone signals, and
counter means
coupled to said gate means and responsive to said tone signals
for causing said gate means to enable operation of said detecting means following a predetermined number of tone signals received thereby.

7. A phone-line-linked, tone-operated control apparatus comprising:
detecting means coupled to receive tone signals from said phone line,
for detecting at least one predetermined sequence of predetermined tone signals and
for producing a corresponding sequence detection signal;
control means responsive to said sequence detection signal
for producing a corresponding control signal; and
access limiting circuit means coupled with said detecting means
for preventing production of said sequence detection signal
until an access sequence comprising
a further predetermined sequence of predetermined tone signals is first received on said phone line;
wherein said access limiting *circuit* means further comprises
a first access sequence detector
responsive only to said access sequence,
a second access sequence detector
responsive only to a second access sequence comprising
a different predetermined sequence of predetermined tone signals, and
enabling circuit means
for normally enabling said first access sequence detector and disabling said second access sequence detector and
responsive to a predetermined number of sequences of tone signals not corresponding to said further predetermined sequence
for disabling said first access sequence detector and enabling said second access sequence detector.

8. A control apparatus according to claim 6 and further including
gate means
coupled to [said] answering means and
responsive to said disabling signal
for causing said answering means to disconnect said detecting means from said phone line.

10. A phone-line-linked, tone-operated control apparatus comprising:
detecting means coupled to receive tone signals from said phone line,
for detecting at least one predetermined sequence of predetermined tone signals and
for producing a corresponding sequence detection signal;
control means responsive to said sequence detection signal
for producing a corresponding control signal;
switching means responsive to said control signal
for activating a given instrument under control; and
feedback means coupled to said switching means
for producing a verifying signal in response to operation of said switching means for activating said instrument under control;
wherein said feedback means includes
  gate means
    coupled with answering circuit means and
    responsive to said verifying signal for momentarily decoupling said [detecting] *answering* circuit means from said phone line and
    thereby producing an audible signal.

11. An access limiting apparatus for use with a phone-line-linked, tone-operated control apparatus and comprising:
access sequence detecting means coupled to receive tone signals from said phone line,
and responsive to a predetermined number of tone signals received on said phone line other than an access sequence comprising a predetermined sequence of predetermined tone signals
  for producing a disabling signal;
disabling means
  coupled to said control apparatus
  for preventing operation thereof in response to said disabling signal;
wherein said access limiting [means] *apparatus* further comprises
  a first access sequence detector
    responsive only to said access sequence,
  a second access sequence detector
    responsive only to a second access sequence comprising
      a different predetermined sequence of predetermined tone signals, and
  enabling circuit means
    for normally enabling said first access sequence detector and disabling said second access sequence detector and
    responsive to a predetermined number of sequences of tone signals not corresponding to said [further predetermined] *access* sequence
      for disabling said first access sequence detector and enabling said second access sequence detector.

15. A phone-line-linked, tone-operated control apparatus comprising:
detecting means coupled to receive tone signals from said phone line,
  for detecting at least one predetermined sequence of predetermined tone signals and
  for producing a corresponding sequence detection signal;
control means responsive to said sequence detection signal
  for producing a corresponding control signal; and
access limiting circuit means coupled with said detecting means
  for preventing production of said sequence detection signal
  until an access sequence comprising
    a further predetermined sequence of predetermined tone signals is first received on said phone line;
wherein said access limiting circuit means comprises
  gating circuit means
    for producing a gate signal in response to tone signals making up said [predetermined] access sequence,
  counter means
    for producing a count signal upon counting a predetermined number of received tone signals greater in number than the number of tone signals in said access sequence, and
  disabling circuit means
    responsive to said count signal and said gate signal
    for disabling production of said sequence detection signal when said access sequence is not present in said predetermined number of received tone signal;
  whereby a selected number of additional, arbitrary tone signals may be received in addition to the signals of said access sequence without disabling production of said sequence detecting [signals] *signal.*
  said selected number of additional signals and the number of signals in said access sequence together equalling the number of signals counted by said counter means.

18. A control apparatus in accordance with claim 1, further including
access limiting means
  coupled with said detecting means,
  for preventing production of said sequence detection signal until an access sequence comprising
    a further predetermined sequence of predetermined tone signals is first received on said phone line;
wherein said access limiting means includes
  access limiting gate means
    coupled with said detecting means
    for normally preventing response thereof to said tone signals, and
  counter means
    coupled to said access limiting gate means and responsive to said tone signals
    for causing said access limiting gate means to enable operation of said detecting means following a predetermined number of tone signals received thereby.

19. A control apparatus in accordance with claim 1, further including
access limiting means coupled with said detecting means
  for preventing production of said sequence detection signal
  until an access sequence comprising
    a further predetermined sequence of predetermined tone signals is first received on said phone line;
wherein said access limiting means further comprises
  a first access sequence detector
    responsive only to said access sequence,
  a second access sequence detector
    responsive only to a second access sequence comprising
      a different predetermined sequence of predetermined tone signals, and
  enabling circuit means
    for normally enabling said first access sequence detector and disabling said second access sequence detector and
    responsive to a predetermined number of sequences of tone signals not corresponding to said access sequence
      for disabling said first access sequence detector and enabling said second access sequence detector.

20. A control apparatus in accordance with claim 1, further including
switching means responsive to said control signal
  for controlling said device; and
feedback means coupled to said switching means
  for producing a verifying signal in response to the changing of said device from one operating state to another;
wherein said feedback means includes
  gate means
    coupled to answering circuit means and responsive to said verifying signal for producing an audible verification signal on said phone line.

21. A control apparatus in accordance with claim 1, further including
access limiting means comprising:
access sequence detecting means coupled to receive tone signals from said phone line,
and responsive to a predetermined number of tone signals received on said phone line other than a first access sequence comprising
a predetermined sequence of predetermined tone signals for producing a disabling signal;
disabling means
coupled to said control apparatus
for preventing operation thereof in response to said disabling signal;
wherein said access limiting means further comprises
a first access sequence detector
responsive only to said first access sequence,
a second access sequence detector
responsive only to a second access sequence comprising
a different predetermined sequence of predetermined tone signals, and
enabling circuit means
for normally enabling said first access sequence detector and disabling said second access sequence detector and
responsive to a predetermined number of sequences of tone signals not corresponding to said first access sequence
for disabling said first access sequence detector and enabling said second access sequence detector.

22. A control apparatus in accordance with claim 1, further including
access limiting means coupled with said detecting means
for preventing production of said sequence detection signal
until an access sequence comprising
a further predetermined sequence of predetermined tone signals is first received on said phone line;
wherein said access limiting means comprises
gating circuit means
for producing a gate signal in response to tone signals making up said access sequence,
counter means
for producing a count signal upon counting a predetermined number of received tone signals greater in number than the number of tone signals in said access sequence, and
disabling circuit means
responsive to said count signal and said gate signal
for disabling production of said sequence detection signal when said access sequence is not present in said
predetermined number of received tone signals;
whereby a selected number of additional, arbitrary tone signals may be received in addition to the signals of said access sequence without disabling production of said sequence detecting signal,
said selected number of additional signals and the number of signals in said access sequence together equalling the number of signals counted by said counter means.

23. A control apparatus in accordance with claim 3, further including
means for coupling said apparatus in parallel with a telephone receiver
for permitting production of said corresponding sequence detection signal and production of said control signal simultaneously with conversation over said telephone receiver.

24. A control apparatus in accordance with claim 3, further including
decoupling means
responsive to a remotely located transmitter going off the telephone line
for disconnecting the control apparatus from the telephone line.

25. A control apparatus in accordance with claim 3, further including
means for coupling said sequence detecting means to said phone line in response to a predetermined member of ring tones received on said phone line.

26. A control apparatus in accordance with claim 3, further including
access limiting means
coupled with said detecting means,
for preventing production of said corresponding sequence detection signal
until an access sequence comprising
a further predetermined sequence of predetermined tone signals is first received on said phone line;
wherein said access limiting means includes
gate means
coupled with said detecting means
for normally preventing response thereof to said tone signals, and
counter means
coupled to said gate means and responsive to said tone signals
for causing said gate means to enable operation of said detecting means following a predetermined number of tone signals received thereby.

27. A control apparatus in accordance with claim 3, further including
access limiting means coupled with said detecting means
for preventing production of said corresponding sequence detection signal
until an access sequence comprising
a further predetermined sequence of predetermined tone signals is first received on said phone line;
wherein said access limiting means further comprises
first access sequence detector
responsive only to said access sequence,
second access sequence detector
responsive only to a second access sequence comprising
a different predetermined sequence of predetermined tone signals, and
enabling circuit means
for normally enabling said first access sequence detector and disabling said second access sequence detector and
responsive to a predetermined number of sequences of tone signals not corresponding to said further predetermined sequence
for disabling said first access sequence detector and enabling said second access sequence detector.

28. A control apparatus in accordance with claim 3, further including switching means responsive to said control signal
for controlling a device; and
feedback means coupled to said switching means
for producing a verifying signal in response to the changing of said device from one operating state to another;
wherein said feedback means includes
gate means
coupled to answering circuit means and
responsive to said verifying signal for producing an audible verification signal on said phone line.

29. A control apparatus in accordance with claim 3, further including
access limiting means comprising:
access sequence detecting means coupled to receive tone signals from said phone line,
and responsive to a predetermined number of tone signals received on said phone line other than a first access sequence comprising
a predetermined sequence of predetermined tone signals for producing a disabling signal;
disabling means
coupled to said control apparatus
for preventing operation thereof in response to said disabling signal;
wherein said access limiting means further comprises
a first access sequence detector
responsive only to said first access sequence,
a second access sequence detector
responsive only to a second access sequence comprising
a different predetermined sequence of predetermined tone signals, and
enabling circuit means
for normally enabling said first access sequence detector and disabling said second access sequence detector and
responsive to a predetermined number of sequences of tone signals not corresponding to said first access sequence
for disabling said first access sequence detector and enabling said second access sequence detector.

30. A control apparatus in accordance with claim 3, further including
access limiting means coupled with said detecting means
for preventing production of said corresponding sequence detection signal
until an access sequence comprising
a further predetermined sequence of predetermined tone signals is first received on said phone line;
wherein said access limiting means comprises
gating circuit means
for producing a gate signal in response to tone signals making up said access sequence,
counter means
for producing a count signal upon counting a predetermined number of received tone signals greater in number than the number of tone signals in said access sequence, and
disabling circuit means
responsive to said count signal and said gate signal
for disabling production of said corresponding sequence detection signal when said access sequence is not present in said predetermined number of received tone signals;
whereby a selected number of additional, arbitrary tone signals may be received in addition to the signals of said access sequence without disabling production of said corresponding sequence detecting signal,
said selected number of additional signals and the number of signals in said access sequence together equalling the number of signals counted by said counter means.

31. A control apparatus in accordance with claim 5, further including
means for coupling said apparatus in parallel with a telephone receiver
for permitting production of said sequence detection signal and production of said control signal simultaneously with conversation over said telephone receiver.

32. A control apparatus in accordance with claim 5, further including
decoupling means
responsive to a remotely located transmitter going off the telephone line
for disconnecting the control apparatus from the telephone line.

33. A control apparatus in accordance with claim 5, further including
means for coupling said sequence detecting means to said phone line in response to a predetermined number of ring tones received on said phone line.

34. A control apparatus in accordance with claim 5, wherein
said access sequence comprising said further predetermined sequence of predetermined tone signals is a first access sequence and,
said access limiting circuit means further comprises
a first access sequence detector
responsive only to said first access sequence,
a second access sequence detector
responsive only to a second access sequence comprising
a different predetermined sequence of predetermined tone signals, and
enabling circuit means
for normally enabling said first access sequence detector and disabling said second access sequence detector and
responsive to a predetermined number of sequences of tone signals not corresponding to said first access sequence
for disabling said first access sequence detector and enabling said second access sequence detector.

35. A control apparatus in accordance with claim 5, further including
switching means responsive to said control signal
for controlling a device; and
feedback means coupled to said switching means
for producing a verifying signal in response to the changing of said device from one operating state to another;
wherein said feedback means includes
gate means
coupled to answering circuit means and
responsive to said verifying signal for producing an audible verification signal on said phone line.

36. A control apparatus in accordance with claim 5, wherein
said access sequence comprising a further predetermined sequence of predetermined tone signals is a first access sequence and said access limiting circuit means further comprises
- access sequence detecting means responsive to a predetermined number of tone signals received on said phone line other than said first access sequence
  - for producing a disabling signal;
- disabling means
  - coupled to said control apparatus
  - for preventing operation thereof in response to said disabling signal;
- first access sequence detector
  - responsive only to said first access sequence,
- a second access sequence detector
  - responsive only to a second access sequence comprising
    - a different predetermined sequence of predetermined tone signals, and
- enabling circuit means
  - for normally enabling said first access sequence detector and disabling said second access sequence detector and
  - responsive to a predetermined number of sequences of tone signals not corresponding to said first access sequence
    - for disabling said first access sequence detector and enabling said second access sequence detector.

37. A control apparatus in accordance with claim 5, wherein
said access limiting circuit means further comprises
- access limiting gating circuit means
  - for producing a gate signal in response to tone signals making up said access sequence,
- wherein said counter means
  - produces a count signal upon counting a predetermined number of received tone signals greater in number than the number of tone signals in said access sequence, and
- further including disabling, circuit means
  - responsive to said count signal and said gate signal
    - for disabling production of said sequence detection signal when said access sequence is not present in said predetermined number of received tone signals;
- whereby a selected number of additional, arbitrary tone signals may be received in addition to the signals of said access sequence without disabling production of said sequence detecting signal,
- said selected number of additional signals and the number of signals in said access sequence together equalling the number of signals counted by said counter means.

38. A control apparatus in accordance with claim 7, further including
means for coupling said apparatus in parallel with a telephone receiver
- for permitting production of said sequence detection signal and production of said control signal simultaneously with conversation over said telephone receiver.

39. A control apparatus in accordance with claim 7, further including
decoupling means
- responsive to a remotely located transmitter going off the telephone line
- for disconnecting the control apparatus from the telephone line.

40. A control apparatus in accordance with claim 7, further including
means for coupling said sequence detecting means to said phone line in response to a predetermined number of ring tones received on said phone line.

41. A control apparatus in accordance with claim 7, further including
switching means responsive to said control signal
- for controlling a device; and
feedback means coupled to said switching means
- for producing a verifying signal in response to the changing of said device from one operating state to another;
- wherein said feedback means includes
  - gate means
    - coupled to answering circuit means and
    - responsive to said verifying signal for producing an audible verification signal on said phone line.

42. A control apparatus in accordance with claim 7, wherein
said access limiting circuit means further comprises
- access sequence detecting means coupled to receive tone signals from said phone line,
  - and responsive to a predetermined number of tone signals received on said phone line other than said access sequence
    - for producing a disabling signal;
- disabling means
  - coupled to said control apparatus
  - for preventing operation thereof in response to said disabling signal.

43. A control apparatus in accordance with claim 7, wherein
said access limiting circuit means further comprises
- gating circuit means
  - for producing a gate signal in response to tone signals making up said access sequence,
- counter means
  - for producing a count signal upon counting a predetermined number of received tone signals greater in number than the number of tone signals in said access sequence, and
- disabling circuit means
  - responsive to said count signal and said gate signal for disabling production of said sequence detection signal when said access sequence is not present in said predetermined number of received tone signals;
- whereby a selected number of additional, arbitrary tone signals may be received in addition to the signals of said access sequence without disabling production of said sequence detecting signal,
- said selected number of additional signals and the number of signals in said access sequence together equalling the number of signals counted by said counter means.

44. A control apparatus in accordance with claim 10, further including
means for coupling said apparatus in parallel with a telephone receiver
- for permitting production of said sequence detection signal and
- production of said control signal simultaneously with conversation over said telephone receiver.

45. A control apparatus in accordance with claim 10, further including
decoupling means
- responsive to a remotely located transmitter going off the telephone line for disconnecting the control apparatus from the telephone line.

46. A control apparatus in accordance with claim 10, further including
means for coupling said sequence detecting means to said phone line in response to a predetermined number of ring tones received on said phone line.

47. A control apparatus in accordance with claim 10, further including
access limiting means
coupled with said detecting means,
for preventing production of said sequence detection signal
until an access sequence comprising
a further predetermined sequence of predetermined tone signals is first received on said phone line;
wherein said access limiting means includes
access limiting gate means
coupled with said detecting means
for normally preventing response thereof to said tone signals, and
counter means
coupled to said access limiting gate means and responsive to said tone signals
for causing said access limiting gate means to enable operation of said detecting means following a predetermined number of tone signals received thereby.

48. A control apparatus in accordance with claim 10, further including
access limiting means coupled with said detecting means
for preventing production of said sequence detection signal
until an access sequence comprising
a further predetermined sequence of predetermined tone signals is first received on said phone line;
wherein said access limiting means further comprises
a first access sequence detector
responsive only to said access sequence,
a second access sequence detector
responsive only to a second access sequence comprising
a different predetermined sequence of predetermined tone signals, and
enabling circuit means
for normally enabling said first access sequence detector and disabling said second access sequence detector and
responsive to a predetermined number of sequences of tone signals not corresponding to said further predetermined sequence
for disabling said first access sequence detector and enabling said second access sequence detector.

49. A control apparatus in accordance with claim 10, further including
access limiting means comprising:
access sequence detecting means coupled to receive tone signals from said phone line,
and responsive to a predetermined number of tone signals received on said phone line other than a first access sequence comprising
a predetermined sequence of predetermined tone signals for producing a disabling signal;
disabling means
coupled to said control apparatus
for preventing operation thereof in response to said disabling signal;
wherein said access limiting means further comprises
first access sequence detector
responsive only to said first access sequence,
a second access sequence detector
responsive only to a second access sequence comprising
a different predetermined sequence of predetermined tone signals, and
enabling circuit means
for normally enabling said first access sequence detector and disabling said second access sequence detector and
responsive to a predetermined number of sequences of tone signals not corresponding to said first access sequence
for disabling said first access sequence detector and enabling said second access sequence detector.

50. A control apparatus in accordance with claim 10, further including
access limiting means coupled with said detecting means
for preventing production of said sequence detection signal
until an access sequence comprising
a further predetermined sequence of predetermined tone signals is first received on said phone line;
wherein said access limiting means comprises
gating circuit means
for producing a gate signal in response to tone signals making up said access sequence,
counter means
for producing a count signal upon counting a predetermined number of received tone signals greater in number than the number of tone signals in said access sequence, and
disabling circuit means
responsive to said count signal and said gate signal
for disabling production of said sequence detection signal when said access sequence is not present in said predetermined number of received tone signals;
whereby a selected number of additional, arbitrary tone signals may be received in addition to the signals of said access sequence without disabling production of said sequence detecting signal,
said selected number of additional signals and the number of signals in said access sequence together equalling the number of signals counted by said counter means.

51. An access limiting apparatus in accordance with claim 11, further including
means for coupling said access limiting apparatus in parallel with a telephone receiver
for permitting simultaneous operation of said access limiting apparatus and conversation over said telephone receiver.

52. An access limiting apparatus in accordance with claim 11, further including
decoupling means
responsive to a remotely located transmitter going off the telephone line
for disconnecting the access limiting apparatus from the telephone line.

53. An access limiting apparatus in accordance with claim 11, further including
means for coupling said access limiting apparatus to said phone line in response to a predetermined number of ring tones received on said phone line.

54. An access limiting apparatus in accordance with claim 11, further including
gating circuit means
for producing a gate signal in response to tone signals making up said access sequence, and
counter means
for producing a count signal upon counting a predetermined number of received tone signals greater in number than the number of tone signals in said access sequence, and
wherein said disabling means is
responsive to said count signal and said gate signal
for disabling operation of said control apparatus when said access sequence is not present in said predetermined number of received tone signals;
whereby a selected number of additional, arbitrary tone signals may be received in addition to the signals of said access sequence without disabling operation of said control apparatus,
said selected number of additional signals and the number of signals in said access sequence together equalling the number of signals counted by said counter means.

55. A control apparatus in accordance with claim 15, further including
means for coupling said apparatus in parallel with a telephone receiver
for permitting production of said sequence detection signal and production of said control signal simultaneously with conversation over said telephone receiver.

56. A control apparatus in accordance with claim 15, further including
decoupling means
responsive to a remotely located transmitter going off the telephone line
for disconnecting the control apparatus from the telephone line.

57. A control apparatus in accordance with claim 15, further including
means for coupling said sequence detecting means to said phone line in response to a predetermined number of ring tones received on said phone line.

58. A control apparatus in accordance with claim 15, further including
switching means responsive to said control signal
for controlling a device; and
feedback means coupled to said switching means
for producing a verifying signal in response to the changing of said device from one operating state to another;
wherein said feedback means includes
gate means
coupled to answering circuit means and
responsive to said verifying signal for producing an audible verification signal on said phone line.

59. A phone-line-linked, tone-operated control apparatus for remotely controlling various functions of at least one device, said apparatus comprising:
integrated circuit detecting means coupled to receive DTMF tone signals from said phone line,
for detecting at least one predetermined sequence of predetermined DTMF tone signals and
for producing a corresponding sequence detection signal;
integrated circuit control means responsive to said sequence detection signal
for producing a corresponding control signal;
wherein said detecting means comprises
first integrated circuit detecting means
for producing a first detection signal in response to the reception of a first predetermined sequence of predetermined DTMF tone signals and
second integrated circuit detecting means
for producing a second detection signal in response to the reception of a second predetermined sequence of predetermined DTMF tone signals;
wherein said control means is
responsive to said first detection signal for producing a corresponding first control signal and
responsive to said second detection signal for producing a corresponding second control signal;
wherein said control means comprises
integrated circuit dual state means
for producing only one of said first control signal and said second control signal at a time; and
wherein said first and said second integrated circuit detecting means further include
integrated circuit gating means
coupled in circuit
for disabling production of said first and said second detection signals respectively
in response to said second control signal and said first control signal, respectively,
whereby said apparatus cannot produce said first detection signal and said second detection signal at the same time.

60. A control apparatus in accordance with claim 59 wherein said detecting means comprises
integrated circuit tone decoding means
responsive to said DTMF tone signals
for producing digitally encoded signals corresponding in a predetermined fashion to said DTMF tone signals; and
integrated circuit digital decoding means
responsive to predetermined ones of said digitally encoded signals occurring in a predetermined sequence for producing said correspoinding sequence detection signal.

61. A control apparatus in accordance with claim 59 and further including
integrated circuit means for coupling said apparatus in parallel with a telephone receiver
for permitting production of said sequence detection signal and production of said control signal simultaneously with conversation over said telephone receiver.

62. A control apparatus in accordance with claim 59 and further including
integrated circuit decoupling means
responsive to a remotely located transmitter going off the telephone line
for disconnecting the control apparatus from the telephone line.

63. A control apparatus in accordance with claim 59 and further including
integrated circuit means for coupling said sequence detecting means to said phone line in response to a predetermined number of ring tones received on said phone line.

64. A control apparatus in accordance with claim 59, further including
integrated circuit access limiting means
coupled with said detecting means, for preventing production of said sequence detection
signal until an access sequence comprising
a further predetermined sequence of predetermined
DTMF tone signals is first received on said phone
line;
wherein said access limiting means includes
integrated circuit access limiting gate means
coupled with said detecting means
for normally preventing response thereof to said DTMF
tone signals, and
integrated circuit counter means
coupled to said access limiting gate means and
responsive to said DTMF tone signals
for causing said access limiting gate means to enable
operation of said detecting means following a predetermined number of DTMF tone signals received
thereby.

65. A control apparatus in accordance with claim 59, further including
integrated circuit access limiting means coupled with said detecting means
for preventing production of said sequence detection signal
until an access sequence comprising
a further predetermined sequence of predetermined DTMF tone signals is first received on said phone line;
wherein said access limiting means further comprises
a first access sequence detector
responsive only to said access sequence,
a second access sequence detector
responsive only to a second access sequence comprising
a different predetermined sequence of predetermined DTMF tone signals, and
integrated circuit enabling circuit means
for normally enabling said first access sequence detector and disabling said second access sequence detector and
responsive to a predetermined number of sequences of DTMF tone signals not corresponding to said access sequence
for disabling said first access sequence detector and enabling said second access sequence detector.

66. A control apparatus in accordance with claim 59, further including
integrated circuit switching means responsive to said control signal
for controlling said device; and
integrated circuit feedback means coupled to said switching means
for producing a verifying signal in response to the changing of said device from one operating state to another;
wherein said feedback means includes
integrated circuit gate means
coupled to integrated circuit answering circuit means and
responsive to said verifying signal for producing an audible verification signal on said phone line.

67. A control apparatus in accordance with claim 59, further including
integrated circuit access limiting means comprising:
integrated circuit access sequence detecting means coupled to receive DTMF tone signals from said phone line,
and responsive to a predetermined number of DTMF tone signals received on said phone line other than a first access sequence comprising a predetermined sequence of predetermined DTMF tone signals for producing a disabling signal:
integrated circuit disabling means
coupled to said control apparatus
for preventing operation thereof in response to said disabling signal;
wherein said access limiting means further comprises
a first access sequence detector
responsive only to said first access sequence,
a second access sequence detector
responsive only to a second access sequence comprising
a different predetermined sequence of predetermined DTMF tone signals, and
integrated circuit enabling circuit means
for normally enabling said first access sequence detector and disabling said second access sequence detector and
responsive to a predetermined number of sequences of DTMF tone signals not corresponding to said first access sequence
for disabling said first access sequence detector and enabling said second access sequence detector.

68. A control apparatus in accordance with claim 59, further including
integrated circuit access limiting means coupled with said detecting means
for preventing production of said sequence detection signal
until an access sequence comprising
a further predetermined sequence of predetermined DTMF tone signals is first received on said phone line;
wherein said access limiting means comprises
integrated circuit gating circuit means
for producing a gate signal in response to DTMF tone signals making up said access sequence
integrated circuit counter means
for producing a count signal upon counting a predetermined number of received DTMF tone signals greater in number than the number of DTMF tone signals in said access sequence, and
integrated circuit disabling circuit means
responsive to said count signal and said gate signal
for disabling production of said sequence detection signal when said access sequence is not present in said predetermined number of received DTMF tone signals;
whereby a selected number of additional, arbitrary DTMF tone signals may be received in addition to the signals of said access sequence without disabling production of said sequence detecting signal,
said selected number of additional signals and the number of signals in said access sequence together equalling the number of signals counted by said counter means.

69. A phone-line-linked, tone-operated control apparatus for remotely and selectively controlling a plurality of operations, said operations being bistable by having only two mutually-exclusive stable operating conditions, said apparatus comprising:
integrated circuit detecting means coupled to receive a plurality of DTMF tone signals from said phone line,
for detecting at least one predetermined sequence of predetermined DTMF tone signals and
for producing a corresponding sequence detection signal; and integrated circuit control means responsive to said sequence detection signal for producing a corresponding control signal;

wherein said detecting means comprises integrated circuit tone decoding means for converting each received one of said plurality of DTMF tone signals into an encoded multiple-bit digital signal, with each said encoded multiple-bit digital signal having a total number of bits substantially less than the total number of DTMF tone signals in said plurality of DTMF tone signals, integrated circuit logic gate means coupled to receive said encoded multiple-bit digital signals and responsive to said encoded multiple-bit digital signals of predetermined logic content for producing gated output signals, and integrated circuit sequence detecting means coupled to said logic gate means for producing said corresponding sequence detection signal in response to production of said gated output signals in a predetermined sequence; and wherein said control means comprises integrated circuit flip-flop means associated with each said bistable operation, with said flip-flop means producing first state and second state output signals for each said bistable operation, said first state output signal corresponding to one of said mutually-exclusive operating conditions, and said second state output signal corresponding to the other of said mutually-exclusive operating conditions, and wherein said flip-flop means is responsive to a sequence detection signal selectively associated with one of said conditions of fewer than all of said bistable operations for changing from said first state output signal to said second state output signal for said fewer than all of said bistable operations and is responsive to a different sequence detection signal selectively associated with the other one of said conditions of fewer than all of said bistable operations for changing from said second state output signal to said first state output signal for said fewer than all of said bistable operations, and maintaining the state of said flip-flop means until and if and only if said flip-flop means responds to a sequence detection signal selectively associated with the other of said conditions of fewer than all of said bistable operations, said first and second state output signals comprising said control signal.

70. A control apparatus in accordance with claim 69 wherein said detecting means includes integrated circuit means for detecting at least two predetermined sequences of predetermined DTMF tone signals and producing corresponding sequence detection signals;

wherein said control means is responsive to each said sequence detection signal for changing state; and further including integrated circuit gating means coupled with said control means and with said sequence detecting means for preventing reception of one of said corresponding sequence detection signal at said control means in response to a corresponding control signal, thereby preventing said control means from changing state in response to consecutive repetition of the same corresponding sequence detection signal.

71. A control apparatus in accordance with claim 69, further including integrated circuit means for coupling said apparatus in parallel with a telephone receiver for permitting production of said corresponding sequence detection signal and production of said control signal simultaneously with conversation over said telephone receiver.

72. A control apparatus in accordance with claim 69, further including integated circuit decoupling means responsive to a remotely located transmitter going off the telephone line for disconnecting the control apparatus from the telephone line.

73. A control apparatus in accordance with claim 69, further including integrated circuit means for coupling said sequence detecting means to said phone line in response to a predetermined number of ring tones received on said phone line.

74. A control apparatus in accordance with claim 69, further including integrated circuit access limiting means coupled with said detecting means, for preventing production of said corresponding sequence detection signal until an access sequence comprising a further predetermined sequence of predetermined DTMF tone signals is first received on said phone line;

wherein said access limiting means includes integrated circuit gate means coupled with said detecting means for normally preventing response thereof to said DTMF tone signals, and integrated circuit counter means coupled to said gate means and responsive to said DTMF tone signals for causing said gate means to enable operation of said detecting means following a predetermined number of DTMF tone signals received thereby.

75. A control apparatus in accordance with claim 69, further including integrated circuit access limiting means coupled with said detecting means for preventing production of said corresponding sequence detection signal until an access sequence comprising a further predetermined sequence of predetermined DTMF tone signals is first received on said phone line;

wherein said access limiting means further comprises a first access sequence detector responsive only to said access sequence, a second access sequence detector responsive only to a second access sequence comprising a different predetermined sequence of predetermined DTMF tone signals, and integrated circuit enabling circuit means for normally enabling said first access sequence detector and disabling said second access sequence detector and responsive to a predetermined number of sequences of DTMF tone signals not corresponding to said further predetermined sequence for disabling said first access sequence detector and enabling said second access sequence detector.

76. A control apparatus in accordance with claim 69, further including integrated circuit switching means responsive to said control signal for controlling a device; and integrated circuit feedback means coupled to said switching means for producing a verifying signal in response to the changing of said device from one operating state to another;

wherein said feedback means includes integrated circuit gate means coupled to integrated circuit answering circuit means and responsive to said verifying signal for producing an audible verification signal on said phone line.

77. A control apparatus in accordance with claim 69, further including integrated circuit access limiting means comprising:

integrated circuit access sequence detecting means coupled to receive DTMF tone signals from said phone line, and responsive to a predetermined number of DTMF tone signals received on said phone line other than a first access sequence comprising a predetermined sequence of predetermined DTMF tone signals for producing a disabling signal;

integrated circuit disabling means coupled to said control apparatus for preventing operation thereof in response to said disabling signal;

wherein said access limiting means further comprises a first access sequence detector responsive only to said first access sequence, a second access sequence detector responsive only to a second access sequence comprising a different predetermined sequence of predetermined DTMF tone signals, and integrated circuit enabling circuit means for normally enabling said first access sequence detector and disabling said second access sequence detector and responsive to a predetermined number of sequences of DTMF tone signals not corresponding to said first access sequence for disabling said first access sequence detector and enabling said second access sequence detector.

78. A control apparatus in accordance with claim 69, further including integrated circuit access limiting means coupled with said detecting means for preventing production of said corresponding sequence detection signal until an access sequence comprising a further predetermined sequence of predetermined DTMF tone signals is first received on said phone line;

wherein said access limiting means comprises integrated circuit gating circuit means for producing a gate signal in response to DTMF tone signals making up said access sequence, integrated circuit counter means for producing a count signal upon counting a predetermined number of received DTMF tone signals greater in number than the number of DTMF tone signals in said access sequence, and integrated circuit disabling circuit means responsive to said count signal and said gate signal for disabling production of said corresponding sequence detection signal when said access sequence is not present in said predetermined number of received DTMF tone signals;

whereby a selected number of additional, arbitrary DTMF tone signals may be received in addition to the signals of said access sequence without disabling production of said corresponding sequence detecting signal, said selected number of additional signals and the number of signals in said access sequence together equalling the number of signals counted by said counter means.

79. A phone-line-linked, tone-operated control apparatus comprising:

integrated circuit detecting means coupled to receive DTMF tone signals from said phone line, for detecting at least one predetermined sequence of predetermined DTMF tone signals and for producing a corresponding sequence detection signal;

integrated circuit control means responsive to said sequence detection signal for producing a corresponding control signal;

integrated circuit access limiting circuit means coupled with said detecting means, for preventing production of said sequence detection signal until an access sequence comprising a further predetermined sequence of predetermined DTMF tone signals is first received on said phone line;

wherein said access limiting circuit means includes integrated circuit gate means coupled with said detecting means for normally preventing response thereof to said DTMF tone signals, and integrated circuit counter means coupled to said gate means and responsive to said DTMF tone signals for causing said gate means to enable operation of said detecting means following a predetermined number of DTMF tone signals received thereby.

80. A control apparatus in accordance with claim 79 wherein said access limiting means further includes integrated circuit access sequence detecting means responsive to a predetermined number of DTMF tone signals consecutively received on said phone line other than said access sequence of producing a disabling signal; and integrated circuit disabling means coupled to said detecting means for preventing production of said sequence detection signal in response to said disabling signal.

80. A control apparatus according to claim 80 and further including integrated circuit gate means coupled to integrated circuit answering means and responsive to said disabling signal for causing said answering means to disconnect said detecting means from said phone line.

82. A control apparatus in accordance with claim 79 and further including integrated circuit access sequence detecting means
for producing a disabling signal in response to a predetermined number of DTMF tone signals not comprising said access sequence and integrated circuit gate means
for disconnecting said detecting means from said phone line in response to said disabling signal.

83. A control apparatus in accordance with claim 79, further including integrated circuit means for coupling said apparatus in parallel with a telephone receiver
for permitting production of said sequence detection signal and production of said control signal simultaneously with conversation over said telephone receiver.

84. A control apparatus in accordance with claim 79, further including integrated circuit decoupling means
responsive to a remotely located transmitter going off the telephone line
for disconnecting the control apparatus from the telephone line.

85. A control apparatus in accordance with claim 79, further including integrated circuit means for coupling said sequence detecting means to said phone line in response to a predetermined number of ring tones received on said phone line.

86. A control apparatus in accordance with claim 79, wherein said access sequence comprising said further predetermined sequence of predetermined DTMF tone signals is a first access sequence and, said access limiting circuit means further comprises
a first access sequence detector
responsive only to said first access sequence,
a second access sequence detector
responsive only to a second access sequence comprising
a different predetermined sequence of predetermined DTMF tone signals, and
integrated circuit enabling circuit means
for normally enabling said first access sequence detector and disabling said second access sequence detector and
responsive to a predetermined number of sequences of DTMF tone signals not corresponding to said first access sequence
for disabling said first access sequence detector and enabling said second access sequence detector.

87. A control apparatus in accordance with claim 79, further including integrated circuit switching means responsive to said control signal
for controlling a device; and integrated circuit feedback means coupled to said switching means
for producing a verifying signal in response to the changing of said device from one operating state to another;
wherein said feedback means includes
integrated circuit gate means
coupled to integrated circuit answering circuit means and
responsive to said verifying signal for producing an audible verification signal on said phone line.

88. A control apparatus in accordance with claim 79, wherein said access sequence comprising a further predetermined sequence of predetermined DTMF tone signals is a first access sequence and said access limiting circuit means further comprises
integrated circuit access sequence detecting means
responsive to a predetermined number of DTMF tone signals received on said phone line other than said first access sequence
for producing a disabling signal;
integrated circuit disabling means
coupled to said control apparatus
for preventing operation thereof in response to said disabling signal;
a first access sequence detector
responsive only to said first access sequence,
a second access sequence detector
responsive only to a second access sequence comprising
a different predetermined sequence of predetermined DTMF tone signals, and
integrated circuit enabling circuit means
for normally enabling said first access sequence detector and disabling said second access sequence detector and
responsive to a predetermined number of sequences of DTMF tone signals not corresponding to said first access sequence
for disabling said first access sequence detector and enabling said second access sequence detector.

89. A control apparatus in accordance with claim 79, wherein said access limiting circuit means further comprises
integrated circuit access limiting gating circuit means
for producing a gate signal in response to DTMF tone signals making up said access sequence,
wherein said counter means
produces a count signal upon counting a predetermined number of received DTMF tone signals greater in number than the number of DTMF tone signals in said access sequence, and
further including integrated circuit disabling circuit means
responsive to said count signal and said gate signal
for disabling production of said sequence detection signal when said access sequence is not present in said predetermined number of received DTMF tone signals;
whereby a selected number of additional, arbitrary DTMF tone signals may be received in addition to the signals of said access sequence without disabling production of said sequence detecting signal,
said selected number of additional signals and the number of signals in said access sequence together equalling the number of signals counted by said counter means.

90. A phone-line-linked, tone-operated control apparatus comprising:

integrated circuit detecting means coupled to receive DTMF tone signals from said phone line,
for detecting at least one predetermined sequence of predetermined DTMF tone signals and
for producing a corresponding sequence detection signal;

integrated circuit control means responsive to said sequence detection signal
for producing a corresponding control signal; and
integrated circuit access limiting circuit means coupled with said detecting means
for preventing production of said sequence detection signal
until an access sequence comprising
a further predetermined sequence of predetermined DTMF tone signals is first received on said phone line;
wherein said access limiting circuit means further comprises
a first access sequence detector
responsive only to said access sequence,
a second access sequence detector
responsive only to a second access sequence comprising
a different predetermined sequence of predetermined DTMF tone signals, and
integrated circuit enabling circuit means
for normally enabling said first access sequence detector and disabling said second access sequence detector and
responsive to a predetermined number of sequences of DTMF tone signals not corresponding to said further predetermined sequence
for disabling said first access sequence detector and enabling said second access sequence detector.

91. A control apparatus in accordance with claim 90, further including
integrated circuit means for coupling said apparatus in parallel with a telephone receiver
for permitting production of said sequence detection signal and production of said control signal simultaneously with conversation over said telephone receiver.

92. A control apparatus in accordance with claim 90, further including
integrated circuit decoupling means
responsive to a remotely located transmitter going off the telephone line
for disconnecting the control apparatus from the telephone line.

93. A control apparatus in accordance with claim 90, further including
integrated circuit means for coupling said sequence detecting means to said phone line in response to a predetermined number of ring DTMF tones received on said phone line.

94. A control apparatus in accordance with claim 90, further including
integrated circuit switching means responsive to said control signal
for controlling a device; and
integrated circuit feedback means coupled to said switching means
for producing a verifying sisal in response to the changing of said device from one operating state to another;
wherein said feedback means includes
integrated circuit gate means
coupled to integrated circuit answering circuit means and
responsive to said verifying signal for producing an audible verification signal on said phone line.

95. A control apparatus in accordance with claim 90, wherein
said access limiting circuit means further comprises
integrated circuit access sequence detecting means coupled to receive DTMF tone signals from said phone line,
and responsive to a predetermined number of DTMF tone signals received on said phone line other than said access sequence
for producing a disabling signal;
integrated circuit disabling means
coupled to said control apparatus
for preventing operation thereof in response to said disabling signal.

96. A control apparatus in accordance with claim 90, wherein
said access limiting circuit means further comprises
integrated circuit gating circuit means
for producing a gate signal in response to DTMF tone signals making up said access sequence,
integrated circuit counter means
for producing a count signal upon counting a predetermined number of received DTMF tone signals greater in number than the number of DTMF tone signals in said access sequence, and
integrated circuit disabling circuit means
responsive to said count signal and said gate signal
for disabling production of said sequence detection signal when said access sequence is not present in said predetermined number of received DTMF tone signals;
whereby a selected number of additional, arbitrary DTMF tone signals may be received in addition to the signals of said access sequence without disabling production of said sequence detecting signal,
said selected number of additional signals and the number of signals in said access sequence together equalling the number of signals counted by said counter means.

97. A phone-line-linked, tone-operated control apparatus comprising:
integrated circuit detecting means coupled to receive DTMF tone signals from said phone line,
for detecting at least one predetermined sequence of predetermined DTMF tone signals and
for producing a corresponding sequence detection signal;
integrated circuit control means responsive to said sequence detection signal
for producing a corresponding control signal;
integrated circuit switching means responsive to said control signal
for activating a given instrument under control; and
integrated circuit feedback means coupled to said switching means
for producing a verifying signal in response to operation of said switching means
for activating said instrument under control;
wherein said feedback means includes
integrated circuit gate means
coupled with integrated circuit answering circuit means and
responsive to said verifying signal for momentarily decoupling said answering circuit means from said phone line and
thereby producing an audible signal.

98. A control apparatus in accordance with claim 97, further including
integrated circuit means for coupling said apparatus in parallel with a telephone receiver for permitting production of said sequence detection signal and production of said control signal simultaneously with conversation over said telephone receiver.

99. A control apparatus in accordance with claim 97, further including
integrated circuit decoupling means
responsive to a remotely located transmitter going off the telephone line
for disconnecting the control apparatus from the telephone line.

100. A control apparatus in accordance with claim 97, further including
integrated circuit means for coupling said sequence detecting means to said phone line in response to a predetermined number of ring DTMF tones received on said phone line.

101. A control apparatus in accordance with claim 97, further including
integrated circuit access limiting means
coupled with said detecting means,
for preventing production of said sequence detection signal
until an access seauence comprising
a further predetermined sequence of predetermined DTMF tone signals is first received on said phone line;
wherein said access limiting means includes
integrated circuit access limiting gate means
coupled with said detecting means
for normally preventing response thereof to said DTMF tone signals, and
integrated circuit counter means
coupled to said access limiting gate means and responsive to said DTMF tone signals
for causing said access limiting gate means to enable operation of said detecting means following a predetermined number of DTMF tone signals received thereby.

102. A control apparatus in accordance with claim 97, further including
integrated circuit access limiting means coupled with said detecting means
for preventing production of said sequence detection signal
until an access sequence comprising
a further predetermined sequence of predetermined DTMF tone signals is first received on said phone line;
wherein said access limiting means further comprises
a first access sequence detector
responsive only to said access sequence,
a second access sequence detector
responsive only to a second access sequence comprising
a different predetermined sequence of predetermined DTMF tone signals, and
integrated circuit enabling circuit means
for normally enabling said first access sequence detector and disabling said second access sequence detector and
responsive to a predetermined number of sequences of DTMF tone signals not corresponding to said further predetermined sequence
for disabling said first access sequence detector and enabling said second access sequence detector.

103. A control apparatus in accordance with claim 97, further including
integrated circuit access limiting means comprising:
integrated circuit access sequence detecting means coupled to receive DTMF tone signals from said phone line,
and responsive to a predetermined number of DTMF tone signals received on said phone line other than a first access sequence comprising
a predetermined sequence of predetermined DTMF tone signals for producing a disabling signal;
integrated circuit disabling means
coupled to said control apparatus
for preventing operation thereof in response to said disabling signal;
wherein said access limiting means further comprises
a first access sequence detector
responsive only to said first access sequence,
a second access sequence detector
responsive only to a second access sequence comprising
a different predetermined sequence of predetermined DTMF tone signals, and
integrated circuit enabling circuit means
for normally enabling said first access sequence detector and disabling said second access sequence detector and
responsive to a predetermined number of sequences of DTMF tone signals not corresponding to said first access sequence
for disabling said first access sequence detector and enabling said second access sequence detector.

104. A control apparatus in accordance with claim 97, further including
integrated circuit access limiting means coupled with said detecting means
for preventing production of said sequence detecting signal
until an access sequence comprising
a further predetermined sequence of predetermined DTMF tone signals is first received on said phone line;
wherein said access limiting means comprises
integrated circuit gating circuit means
for producing a gate signal in response to DTMF tone signals making up said access sequence,
integrated circuit counter means
for producing a count signal upon counting a predetermined number of received DTMF tone signals greater in number than the number of DTMF tone signals in said access sequence, and
integrated circuit disabling circuit means
responsive to said count signal and said gate signal
for disabling production of said sequence detection signal when said access sequence is not present in said predetermined number of received DTMF tone signals;
whereby a selected number of additional, arbitrary DTMF tone signals may be received in addition to the signals of said access sequence without disabling production of said sequence detecting signal,
said selected number of additional signals and the number of signals in said access sequence together equalling the number of signals counted by said counter means.

105. An access limiting apparatus for use with a phone-line-linked, tone-operated control apparatus and comprising:

integrated circuit access sequence detecting means coupled
to receive DTMF tone signals from said phone line,
and responsive to a predetermined number of DTMF tone
signals received on said phone line other than an
access sequence comprising a predetermined sequence
of predetermined DTMF tone signals
for producing a disabling signal;
integrated circuit disabling means
coupled to said control apparatus
for preventing operation thereof in response to said
disabling signal;
wherein said access limiting apparatus further comprises
a first access sequence detector
responsive only to said access sequence,
a second access sequence detector
responsive only to a second access sequence comprising
a different predetermined sequence of predetermined
DTMF tone signals, and
integrated circuit enabling circuit means
for normally enabling said first access sequence detector and disabling said second access sequence detector and
responsive to a predetermined number of sequences of DTMF tone signals not corresponding to said access sequence
for disabling said first access sequence detector and enabling said second access sequence detector.

106. An access limiting apparatus in accordance with claim 105 and further including
integrated circuit answering means
for normally coupling said control apparatus to said phone line in response to a predetermined number of ring tones received on said phone line; and
integrated circuit gate means
for disconnecting said control apparatus from said phone line in response to said disabling signal.

107. An access limiting apparatus according to claim 105 and further including
integrated circuit answering means
coupled to said phone line and
responsive to a predetermined number of ring tones received on said phone line for coupling said control apparatus to said phone line; and
integrated circuit gate means
coupled to said answering means and
responsive to said disabling signal for causing said answering means to disconnect said control apparatus from said phone line.

108. An access limiting apparatus in accordance with claim 105, further including
integrated circuit means for coupling said access limiting apparatus in parallel with a telephone receiver
for permitting simultaneous operation of said access limiting apparatus and conversation over said telephone receiver.

109. An access limiting apparatus in accordance with claim 105, further including
integrated circuit decoupling means
responsive to a remotely located transmitter going off the telephone line
for disconnecting the access limiting apparatus from the telephone line.

110. An access limiting apparatus in accordance with claim 105, further including
integrated circuit means for coupling said access limiting apparatus to said phone line in response to a predetermined number of ring tones received on said phone line.

111. An access limiting apparatus in accordance with claim 105, further including,
integrated circuit gating circuit means
for producing a gate signal in response to DTMF tone signals making up said access sequence, and
integrated circuit counter means
for producing a count signal upon counting a predetermined number of received DTMF tone signals greater in number than the number of DTMF tone signals in said access sequence, and
wherein said disabling circuit means is
responsive to said count signal and said gate signal
for disabling operation of said control apparatus when said access sequence is not present in said predetermined number of received DTMF tone signals;
whereby a selected number of additional, arbitrary DTMF tone signals may be received in addition to the signals of said access sequence without disabling operation of said control apparatus,
said selected number of additional signals and the number of signals in said access sequence together equalling the number of signals counted by said counter means.

112. A phone-line-linked, tone-operated control apparatus comprising:
integrated circuit detecting means coupled to receive DTMF tone signals from said phone line,
for detecting at least one predetermined sequence of predetermined DTMF tone signals and
for producing a corresponding sequence detection signal;
integrated circuit control means responsive to said sequence detection signal
for producing a corresponding control signal; and
integrated circuit access limiting circuit means coupled with said detecting means
for preventing production of said sequence detection signal
until an access sequence comprising
a further predetermined sequence of predetermined DTMF tone signals is first received on said phone line;
wherein said access limiting circuit means comprises
integrated circuit gating circuit means
for producing a gate signal in response to DTMF tone signals making up said access sequence,
integrated circuit counter means
for producing a count signal upon counting a predetermined number of received DTMF tone signals greater in number than the number of DTMF tone signals in said access sequence, and
integrated circuit disabling circuit means
responsive to said count signal and said gate signal
for disabling production of said sequence detection signal when said access sequence is not present in said predetermined number of received DTMF tone signals;
whereby a selected number of additional, arbitrary DTMF tone signals may be received in addition to the signals of said access sequence without disabling production of said sequence detecting signal,
said selected number of additional signals and the number of signals in said access sequence together equalling the number of signals counted by said counter means.

113. A control apparatus in accordance with claim 112, further including integrated circuit means for coupling said apparatus in parallel with a telephone receiver for permitting production of said sequence detection signal and production of said control signal simultaneously with conversation over said telephone receiver.

114. A control apparatus in accordance with claim 112, further including integrated circuit decoupling means responsive to a remotely located transmitter going off the telephone line for disconnecting the control apparatus from the telephone line.

115. A control apparatus in accordance with claim 112, further including integrated circuit means for coupling said sequence detecting means to said phone line in response to a predetermined number of ring tones received on said phone line.

116. A control apparatus in accordance with claim 112, further including integrated circuit switching means responsive to said control signal for controlling a device; and integrated circuit feedback means coupled to said switching means for producing a verifying signal in response to the changing of said device from one operating state to another;

wherein said feedback means includes integrated circuit gate means coupled to integrated circuit answering circuit means and responsive to said verifying signal for producing an audible verification signal on said phone line.

* * * * *